US010691904B1

(12) United States Patent
Randall et al.

(10) Patent No.: US 10,691,904 B1
(45) Date of Patent: Jun. 23, 2020

(54) HANDICAPPED PARKING PLACARD

(71) Applicant: IPS Group Inc., San Diego, CA (US)

(72) Inventors: Chad P. Randall, San Diego, CA (US); David William King, Rancho Santa Fe, CA (US); Alexander Schwarz, San Diego, CA (US)

(73) Assignee: IPS GROUP INC., San Diego, CA (US)

( * ) Notice: Subject to any disclaimer, the term of this patent is extended or adjusted under 35 U.S.C. 154(b) by 0 days.

(21) Appl. No.: 15/423,268

(22) Filed: Feb. 2, 2017

Related U.S. Application Data

(60) Provisional application No. 62/298,747, filed on Feb. 23, 2016.

(51) Int. Cl.
*G06K 7/10* (2006.01)
*G06K 9/00* (2006.01)

(52) U.S. Cl.
CPC ..... *G06K 7/10366* (2013.01); *G06K 9/00087* (2013.01); *G06Q 2240/00* (2013.01)

(58) Field of Classification Search
CPC .................................................. G06K 7/10366
See application file for complete search history.

(56) References Cited

U.S. PATENT DOCUMENTS

| 4,310,890 | A |  | 1/1982 | Trehn et al. |
| 4,460,965 | A |  | 7/1984 | Trehn et al. |
| 5,201,396 | A |  | 4/1993 | Chalabian et al. |
| 5,642,119 | A |  | 6/1997 | Jacobs et al. |
| 6,121,880 | A | * | 9/2000 | Scott ................ B32B 17/06 340/10.1 |
| 6,812,857 | B1 |  | 11/2004 | Kassab et al. |
| 6,885,311 | B2 |  | 4/2005 | Howard et al. |
| 7,023,360 | B2 |  | 4/2006 | Staniszewski et al. |
| 7,533,809 | B1 | * | 5/2009 | Robinson ......... G06Q 20/40145 235/382 |
| 7,783,530 | B2 |  | 8/2010 | Slemmer et al. |
| 7,945,670 | B2 | * | 5/2011 | Nakamura ............ H04L 63/104 709/226 |
| 8,402,380 | B2 | * | 3/2013 | Kikin-Gil ............ G06Q 10/109 715/764 |
| 8,957,787 | B1 |  | 2/2015 | Al-Hmalan et al. |
| 9,064,358 | B2 |  | 6/2015 | Lidror |
| 9,147,345 | B2 |  | 9/2015 | Agrait et al. |
| 9,407,608 | B2 | * | 8/2016 | Mullick .............. H04L 63/0272 |
| 9,508,260 | B2 |  | 11/2016 | Shaik et al. |
| 9,519,761 | B2 | * | 12/2016 | Jakobsson ............... G06F 21/31 |
| 2003/0058084 | A1 | * | 3/2003 | O'Hara ................. G07B 15/00 340/5.53 |

(Continued)

FOREIGN PATENT DOCUMENTS

| GB | 2461397 A | * | 1/2010 | ............. G07B 15/02 |
| KR | 10-2006-0088085 |  | * 8/2006 | ............. G08G 1/017 |

OTHER PUBLICATIONS

Scoop Media, "Technology breakthrough counters abuse of disabled parking," Scoop Media Ltd., Dec. 7, 2011.*

*Primary Examiner* — Nathan Erb

(74) *Attorney, Agent, or Firm* — Wilson Sonsini Goodrich & Rosati

(57) ABSTRACT

Disclosed are computer-implemented handicapped parking placards as well as methods and platforms for operating handicapped parking placard systems.

15 Claims, 7 Drawing Sheets

(56) References Cited

U.S. PATENT DOCUMENTS

| | | | |
|---|---|---|---|
| 2004/0254840 A1* | 12/2004 | Slemmer | G06Q 10/02 705/22 |
| 2005/0226201 A1 | 10/2005 | McMillin et al. | |
| 2006/0136131 A1 | 6/2006 | Dugan et al. | |
| 2006/0227010 A1* | 10/2006 | Berstis | G08G 1/14 340/932.2 |
| 2007/0040449 A1 | 2/2007 | Spurlin et al. | |
| 2008/0052254 A1 | 2/2008 | Al Amri et al. | |
| 2008/0061967 A1* | 3/2008 | Corrado | G06K 7/10079 340/539.26 |
| 2009/0174528 A1* | 7/2009 | Toda | G06K 7/0004 340/10.1 |
| 2011/0210827 A1* | 9/2011 | Lidror | G07B 15/02 340/10.1 |
| 2014/0158767 A1* | 6/2014 | Ramaci | G06K 7/084 235/449 |
| 2014/0344891 A1* | 11/2014 | Mullick | H04L 63/0272 726/1 |
| 2015/0029041 A1* | 1/2015 | Liu | G08G 1/143 340/932.2 |
| 2015/0179070 A1* | 6/2015 | Sandbrook | G08G 1/149 340/932.2 |
| 2015/0278969 A1* | 10/2015 | Benoy | G06Q 10/00 705/13 |
| 2015/0288713 A1* | 10/2015 | Lawrence | G06Q 30/00 726/25 |
| 2015/0302057 A1* | 10/2015 | Kealey | G09B 7/02 707/768 |
| 2016/0055322 A1* | 2/2016 | Thomas | G06F 21/10 726/7 |
| 2016/0267340 A1* | 9/2016 | Jensen | G06K 9/00288 |
| 2017/0032485 A1* | 2/2017 | Vemury | G06Q 50/265 |
| 2017/0032582 A1 | 2/2017 | Moran et al. | |
| 2017/0094517 A1* | 3/2017 | Jakobsson | H04W 12/06 |
| 2017/0096123 A1* | 4/2017 | Gennermann | B60R 25/241 |

* cited by examiner

HANDICAPPED PARKING PLACARD

CROSS-REFERENCE TO RELATED APPLICATIONS

This application claims the benefit of U.S. Provisional Patent Application No. 62/298,747, filed on Feb. 23, 2016, which is entirely incorporated herein by reference.

BACKGROUND OF THE INVENTION

Handicapped placards or hang tags are issued to handicapped individuals so that they may obtain preferential parking in many retail as well as municipal parking locations. Many times, displaying a handicapped placard means that the vehicle is not required to pay for parking or receives additional benefits, such as extended time in a time restricted area. For example, California, which has 24 million licensed drivers, issued approximately 2.1 million permanent placards in 2016, up from 1.2 million a decade ago. In Los Angeles County, about 621,000 of nearly 6 million licensed drivers have placards. One data shows that the City of Los Angeles has six legal placards for every city meter. Under the circumstances, abuse of placards leads to a significant loss of revenue and circumvents parking policies.

SUMMARY OF THE INVENTION

The enforcement of conventional paper based parking placard relies on the police officer checking each parking space, and it creates several ways of placard being abused. A valid placard is used by people or vehicles other than those originally intended, such as relatives or friends when the intended party is not present. A counterfeit placard is very easy to pass a fake as the real thing without an easy mechanism to confirm validity. An intended party uses a valid placard for a longer duration than originally intended by the original intended party or anyone else in possession of the placard.

The novel idea disclosed herein is applying electronic and security aspect to a generally paper based placard. It utilizes technology to overcome the many reasons that placards are abused without obstructing the intended and original purpose of issuing such placards and without dramatically changing the form factor or the traditional model. The present invention addresses all of these issues by making it more difficult to create counterfeits, provides visual indication for enforcement and validity purposes, including interaction with $3^{rd}$ party enforcement device, and is only activated by the person for whom the placard was originally intended.

In one aspect, disclosed herein are computer-implemented methods of operating a handicapped parking placard system comprising: wirelessly receiving, by a computing device, a unique identifier transmitted from an in-vehicle electronic handicapped parking placard; receiving, at the computing device, input from a parking user verifying their identity; transmitting, by the computing device, the unique identifier and the input from the parking user to a central parking database; and receiving, by the computing device, handicapped parking placard configuration data from the central parking database in response to the transmission, the data comprising one or more of: verification of the authenticity of the electronic handicapped parking placard, validation of the electronic handicapped parking placard, the identity of the authorized parking user, and restrictions on the handicapped parking privileges. In some embodiments, the in-vehicle electronic handicapped parking placard is a hang tag. In other embodiments, the in-vehicle electronic handicapped parking placard is an adhesive decal. In some embodiments, the computing device is a parking meter. In other embodiments, the computing device is a mobile device of the parking user. In some embodiments, the input from the parking user is a personal identification number (PIN). In other embodiments, the input from the parking user is biometric data. In some embodiments, the computing device is configured to present an interface to renew or extend the validity of the electronic handicapped parking placard. In some embodiments, the method further comprises: activating, by the computing device, a visual display on the electronic handicapped parking placard, the display configured to provide a counter indicating the time remaining in a current parking period.

In another aspect, disclosed herein are computer-implemented handicapped parking placards comprising: a power source; a processor and a memory; a—wireless communications module configured to communicate a unique identifier to an external device, the identifier associated in an external database with placard information; and a biometric verification module configured to verify the identity of an authorized user and upon verification activate the placard for a parking period. In some embodiments, the placard is a hang tag. In other embodiments, the placard is an adhesive decal. In some embodiments, the external device is a parking meter. In other embodiments, the external device is a mobile device of the user. In some embodiments, the placard information comprises an indicator of the authenticity of the electronic handicapped parking placard, an indicator of the validity of the electronic handicapped parking placard, the identity of an authorized user of the electronic handicapped parking placard, restrictions on the handicapped parking privileges, or a combination thereof. In some embodiments, the placard further comprises a passive radio-frequency identification (RFID) tag, the tag configured to allow interrogation for the purposes of validation of the tag. In some embodiments, the power source comprises a battery. In further embodiments, the power source comprises a solar panel. In some embodiments, the placard further comprises a visual display configured to provide a counter indicating the time remaining in the current parking period.

In another aspect, disclosed herein are platforms comprising: an electronic handicapped parking placard comprising: a processor, a memory, and a power source; and a wireless communications module configured to communicate a unique identifier to an external application; a parking user application comprising a software module configured to receive the unique identifier and use the identifier to query a central parking database to enter or edit handicapped parking placard configuration data and renew or extend the validity of the placard; and a parking enforcement application comprising a software module configured to receive the unique identifier and use the identifier to query a central parking database for handicapped parking placard configuration data, the data comprising one or more of: verification of the authenticity of the electronic handicapped parking placard, validation of the electronic handicapped parking placard, the identity of the authorized parking user, and restrictions on the handicapped parking privileges. In some embodiments, the electronic handicapped parking placard is a hang tag. In other embodiments, the electronic handicapped parking placard is an adhesive decal. In some embodiments, the parking enforcement application is executed on a parking meter. In other embodiments, the parking enforcement application is executed on a mobile device of a parking enforcement officer. In yet other embodiments, the parking user application is executed on a mobile device of a parking user. In some embodiments, the electronic handicapped parking placard further comprises a visual display configured to provide a counter indicating the time remaining in the current parking period.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
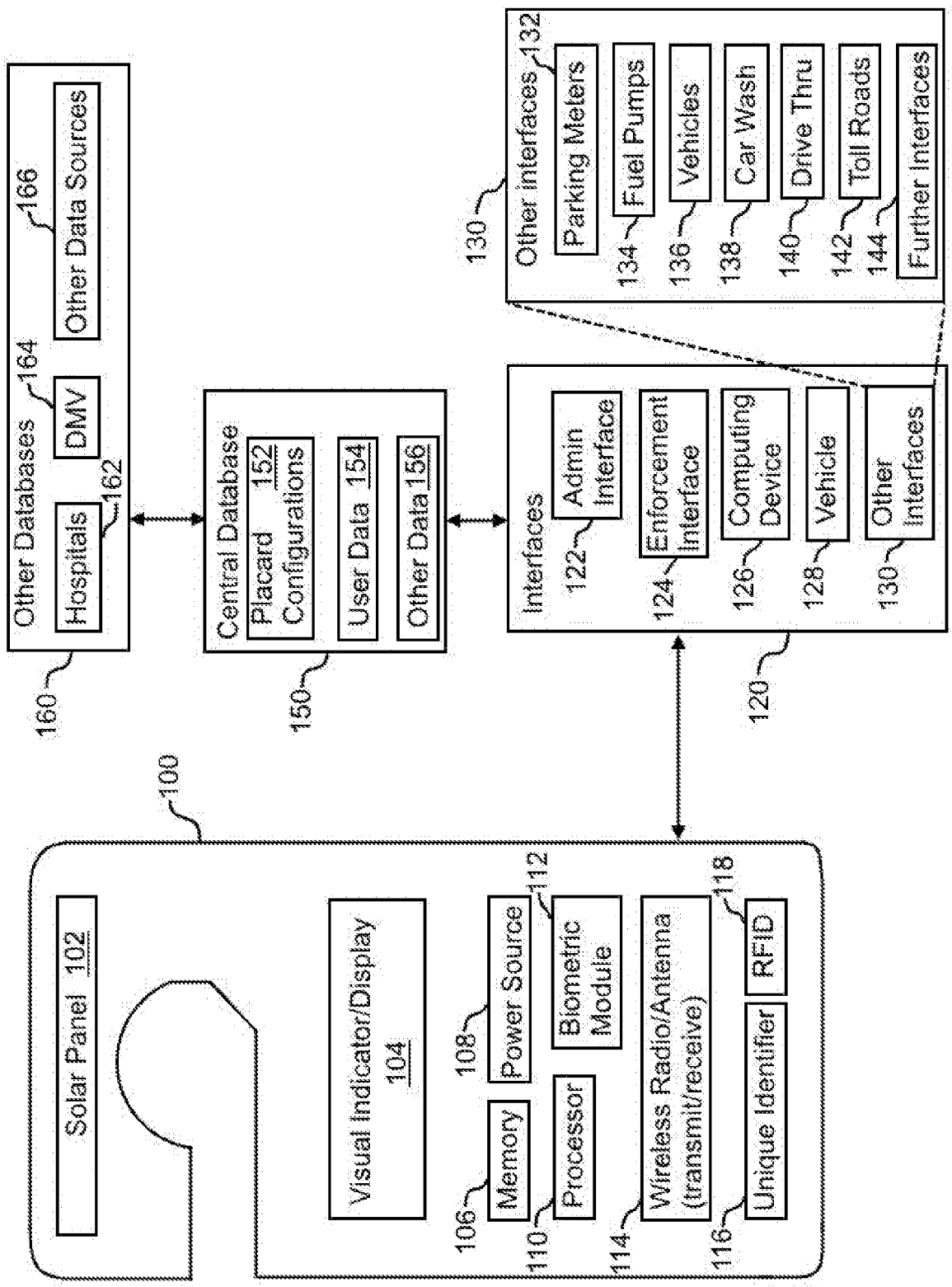
FIG. 1 shows a non-limiting example of a user authorization system described herein; in this case, a placard, and an exemplary functional block diagram.

Traditional handicapped placards or hang tags are often abused by people who want to take advantage of the privileges of these special parking permits. Common ways of abuse include counterfeiting, letting people other than the authorized person to use the placard or hang tag, faking illness or injury to obtain medical certification for handicapped parking, and parking while not transporting a disabled person. Compounding this issue is the sheer number of legitimate handicapped placard issued, in part due to America's aging population. For example, at least one out of every eight California drivers has a disabled placard. Even though investigators catch hundreds of people misusing the handicapped placards every year, they know that there might be tens-of-thousands more cases of abuse that have gone unreported.

The enforcement agencies face technical challenges to catch the violators because current technologies associated with handicapped placards are prone to counterfeit. The same technologies are also time-consuming for the enforcement agencies to validate each suspicious handicapped placard or hangtag. For example, in California, an agent does not assume placard abuse simply because a driver looks healthy. As a result, the abuse of handicapped placards and hangtags siphons revenues away from municipal governments and prevents access to special parking spaces by law abiding drivers who are handicapped. Thus, there is a need to develop and implement technologies related to handicapped placards to reduce the afore-mentioned counterfeiting/abuse problems and to facilitate efficient enforcement mechanisms of handicapped placard, allowing, for example, real time online and/or wireless verification of displayed placards.

Described herein, in certain embodiments, are computer-implemented methods of operating a handicapped parking placard system comprising: wirelessly receiving, by a computing device, a unique identifier transmitted from an in-vehicle electronic handicapped parking placard; receiving, at the computing device, input from a parking user verifying their identity; transmitting, by the computing device, the unique identifier and the input from the parking user to a central parking database; receiving, by the computing device, handicapped parking placard configuration data from the central parking database in response to the transmission, the data comprising one or more of: verification of the authenticity of the electronic handicapped parking placard, validation of the electronic handicapped parking placard, the identity of the authorized parking user, and restrictions on the handicapped parking privileges; activating, by the computing device, a visual display on the electronic handicapped parking placard, the display configured to provide a counter indicating the time remaining in a current parking period.

Also described herein, in certain embodiments, are computer-implemented handicapped parking placards comprising: a power source; a processor and a memory; a wireless communications module configured to communicate a unique identifier to an external device, the identifier associated in an external database with placard information; a biometric verification module configured to verify the identity of an authorized user and upon verification activate the placard for a parking period; a visual display configured to provide a counter indicating the time remaining in the current parking period.

Also described herein, in certain embodiments, are platforms comprising: an electronic handicapped parking placard comprising: a processor, a memory, and a power source; a wireless communications module configured to communicate a unique identifier to an external application; a visual display configured to provide a counter indicating the time remaining in the current parking period; a parking user application comprising a software module configured to receive the unique identifier and use the identifier to query a central parking database to enter or edit handicapped parking placard configuration data and renew or extend the validity of the placard; and a parking enforcement application comprising a software module configured to receive the unique identifier and use the identifier to query a central parking database for handicapped parking placard configuration data, the data comprising one or more of: verification of the authenticity of the electronic handicapped parking placard, validation of the electronic handicapped parking placard, the identity of the authorized parking user, and restrictions on the handicapped parking privileges.

Also described herein, in certain embodiments, are computer-implemented vehicle or personal identifier comprising: a power source; a processor and a memory; a wireless communications module configured to communicate a unique code to an external device, the unique code associated in an external database with information of the vehicle or personal identifier; a biometric verification module configured to verify the identity of an authorized vehicle or user and upon verification activate the vehicle or personal identifier for a staying period; a visual display configured to provide a counter indicating the time remaining in the current staying period.

Certain Definitions

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

User Authentication System

In some embodiments, the methods, systems, and platforms described herein include a user authentication system, or the use of the same. In some embodiments, a user authentication system includes, by way of non-limiting examples, a placard, a plug-in device, a software-only solution, a decal, a hang tag, a bracelet, a token, and an embedded device in a vehicle.

In some embodiments, the user authentication system is a placard, including, for example, a handicapped placard. In certain embodiments, the user authentication system is a placard 100 as shown in FIG. 1. Referring to FIG. 1, in some embodiments, the placard 100 comprises a solar panel 102, to convert light into energy. In some embodiments, the placard 100 comprises a visual indicator or a display 104, which is configured to provide a counter indicating the time remaining in the current parking period, or to provide an indicator of the authenticity of the placard to be used under the current conditions, or to provide an indicator of the validity of the placard, the identity of an authorized user of the placard, restrictions on the privileges to use the placard, or a combination thereof. In some embodiments, the placard 100 comprises a power source 108, which, in some embodiments, is different from the solar panel 102, and in some embodiments, is the same as the solar panel 102. In some embodiments, the power source 108 is battery powered and the battery is a rechargeable battery. In other embodiments, the power source 108 is wirelessly charged. For example, in some embodiments, the power source 108 allows an electromagnetic field to transfer power from a transmitting source to the power source 108 or a battery (not shown). In some embodiment, the placard 100 comprises a memory 106 and a processor 110, which, for example, records information, operates other components of the placard 100, and communicates with external devices. In some embodiments, the placard 100 comprises a biometric module 112, which is configured to verify the identity of an authorized user and, upon verification, activate the placard for a parking period or other authorized operations. In some embodiments, the biometric module 112 is built into the processor 110. In other embodiments, the biometric module 112 is stored in or transmitted from interfaces other than the placard 100. For example, in some embodiments, the biometric module 112 is stored in a computing device, including the user's mobile device such as a cell phone, and in other embodiments, the biometric module 112 is stored in the electronic system of the user's vehicle.

In some embodiments, the placard 100 comprises a wireless radio or antenna 114, which transmits signals to and receive signals from external devices, including, for example, various interfaces described elsewhere. In some embodiments, the transmission is wireless communications. For example, in some embodiments, the wireless communications are enabled by near-field communication (NFC), Bluetooth, Wi-Fi, Global System for Mobile communications (GSM), Code Division Multiple Access (CDMA), Long-Term Evolution (LTE), cellular telephone, satellite, or other IP embedded wireless communications. In some embodiments, the external device is a parking meter, a vehicle sensor, traffic/red-light cameras, traffic lights or other city infrastructure, a mobile device (such as a smart phone), wireless technology embedded in the vehicle itself, city wireless infrastructure including, for example, Wi-Fi networks, mesh networks, Low-Power Wide-Area Network (LPWAN) or Low-Power Network (LPN), or other proprietary wireless Internet of Things (IoT) networks. In further embodiments, the external device is a mobile device of the user. In some embodiments, the placard 100 comprises a unique identifier 116 described elsewhere. In some embodiments, the placard 100 comprises a passive RFID tag 118, which is configured to allow interrogation for the purposes of validation of the placard.

In some embodiments, the placard 100 communicates with interfaces 120 via its wireless radio/antenna 114 and receives information/signal from the interfaces 120 when authorized. For example, the wireless radio/antenna 114 transmits the unique identifier 116 to the interfaces 120 and then receives confirmation/authorization from the interfaces 120 for the proper use of the placard 100 under different conditions. In other embodiments, the interfaces 120 comprises one or more of interfaces such as, for example, admin interface 122 including parking authority admin interface, enforcement interface 124 including police enforcement interface, computing device interface 126 including mobile device interface owned by the user or a third-party, vehicle interface 128 which allows the placard 100 to access data related to the user's vehicle, and other interfaces 130 described below.

In further embodiments, the other interfaces 130 comprise one or more of interfaces such as, for example, parking meters interface 132, fuel pumps interface 134, additional vehicles interface 136 which allows the placard to access data related to vehicles other than the vehicle the user is using, car wash interface 138, drive thru interface 140, toll roads interface 142, and further interfaces 144. In some embodiments, the placard 100, through its processor 110 and wireless radio/antenna 114, exchanges information with the interfaces 120 and seeks authorization to complete transactions with one or more of admin agent/agency, enforcement agent/agency, computing device, user's vehicle or other's vehicles, parking meters, fuel pumps, car wash service, drive thru service, toll road service and other permission-required services associated with the use of the user's vehicle.

In other embodiments, the interfaces 120 communicate with a central database 150 during the authentication process. Generally speaking, the central database 150 is located remotely, but, in some cases, allows a local copy of the central database 150 to be downloaded into a device of the user including the user's mobile device and the user's vehicle. In some embodiments, the central database 150 comprises one or more databases such as a placard configurations central database 152 storing configurations data related to placards, a user data central database 154 storing user information related to each authorized user, and other data central database 156 storing data other than placard configurations and user information data.

In some embodiments, the central database 150 communicates with other databases 160 including one or more databases such as, for example, hospital database 162 to check user's medical conditions/records, Department of Motor Vehicle (DMV) database 164 to check user's driving records and/or authorized parking status, and other data sources 166 for data associated with the user and/or user's vehicle. Generally speaking, the other databases 160 are located remotely, but allow a local copy of the other databases 160 to be downloaded into a device of the user including the user's mobile device and the user's vehicle. Further descriptions of embodiments of the placard and its operations are found elsewhere in this disclosure.

Figure 2:
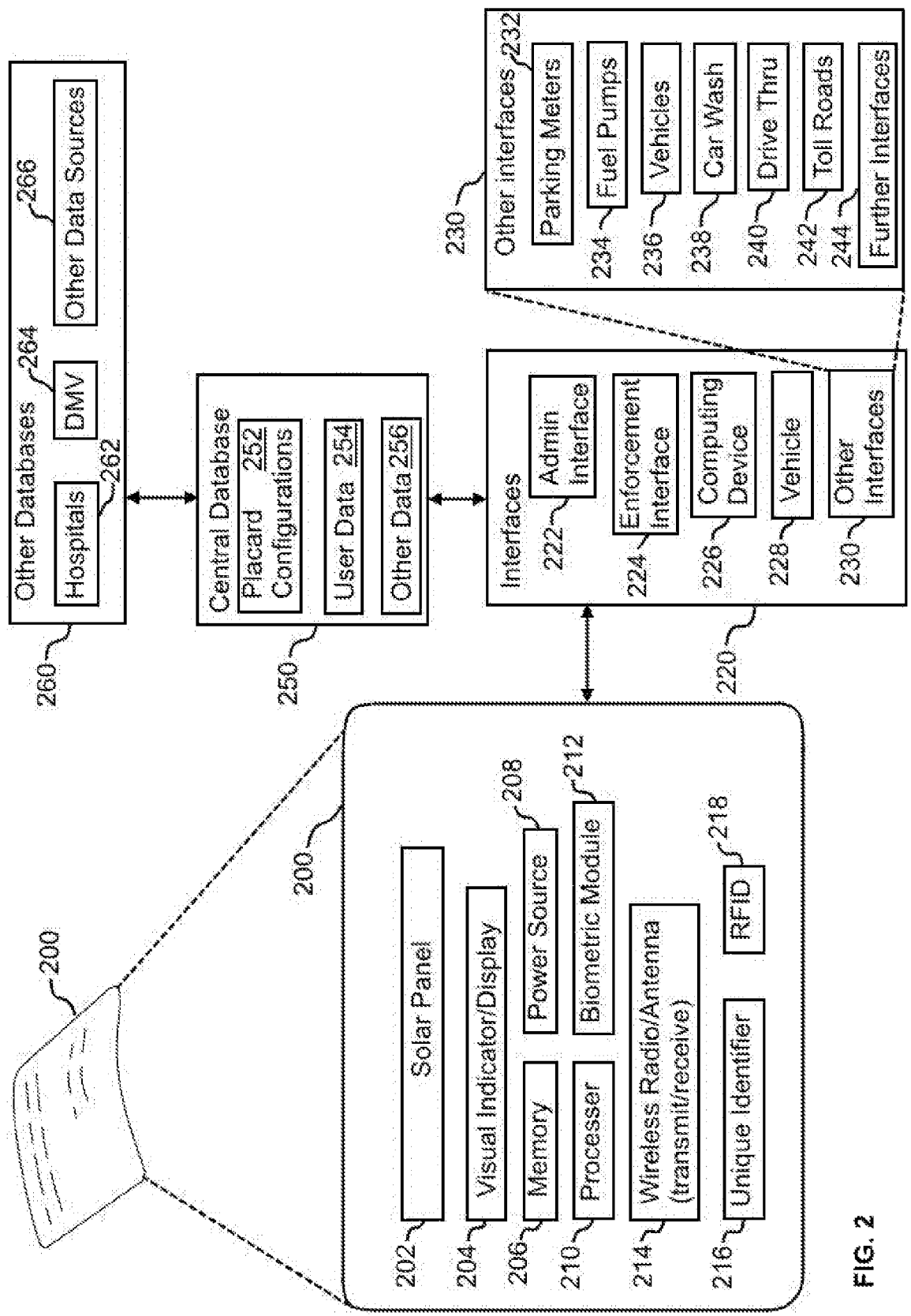
FIG. 2 shows another non-limiting example of a user authorization system described herein; in this case, a decal, and an exemplary functional block diagram.

In some embodiments, the user authentication system is a decal, such as, for example, an adhesive decal, a decal that is affixed to the windshield, and a decal that is affixed to the license plate. In certain embodiments, the user authentication system is a decal 200 as shown in FIG. 2. Referring to FIG. 2, in some embodiments, the decal 200 comprises a solar panel 202, to convert light into energy. In some embodiments, the decal 200 comprises a visual indicator or a display 204, which is configured to provide a counter indicating the time remaining in the current parking period, or to provide an indicator of the authenticity of the decal to be used under the current conditions, or to provide an indicator of the validity of the decal, the identity of an authorized user of the decal, restrictions on the privileges to use the decal, or a combination thereof. In some embodiments, the decal 200 comprises a power source 208, which, in some embodiments, is different from the solar panel 202, and in some embodiments, is the same as the solar panel 202. In some embodiments, the power source 208 is battery powered and the battery is a rechargeable battery. In other embodiments, the power source 208 is wirelessly charged. For example, in some embodiments, the power source 208 allows an electromagnetic field to transfer power from a transmitting source to the power source 208 or a battery (not shown). In some embodiment, the decal 200 comprises a memory 206 and a processor 210, which, for example, records information, operates other components of the decal 200, and communicates with external devices. In some embodiments, the decal 200 comprises a biometric module 212, which is configured to verify the identity of an authorized user and, upon verification, activate the decal for a parking period or other authorized operations. In some embodiments, the biometric module 212 is built into the processor 210. In other embodiments, the biometric module 212 is stored in or transmitted from interfaces other than the decal 200. For example, in some embodiments, the biometric module 212 is stored in a computing device, including the user's mobile device such as a cell phone, and in other embodiments, the biometric module 212 is stored in the electronic system of the user's vehicle.

In some embodiments, the decal 200 comprises a wireless radio or antenna 214, which transmits signals to and receive signals from external devices, including, for example, various interfaces described elsewhere. In some embodiments, the transmission is wireless communications. For example, in some embodiments, the wireless communications are enabled by near-field communication (NFC), Bluetooth, Wi-Fi, Global System for Mobile communications (GSM), Code Division Multiple Access (CDMA), Long-Term Evolution (LTE), cellular telephone, satellite, or other IP embedded wireless communications. In some embodiments, the external device is a parking meter, a vehicle sensor, traffic/red-light cameras, traffic lights or other city infrastructure, a mobile device (such as a smart phone), wireless technology embedded in the vehicle itself, city wireless infrastructure including, for example, Wi-Fi networks, mesh networks, Low-Power Wide-Area Network (LPWAN) or Low-Power Network (LPN), or other proprietary wireless Internet of Things (IoT) networks. In further embodiments, the external device is a mobile device of the user. In some embodiments, the decal 200 comprises a unique identifier 216 described elsewhere. In some embodiments, the decal 200 comprises a passive RFID tag 218, which is configured to allow interrogation for the purposes of validation of the decal.

In some embodiments, the decal 200 communicates with interfaces 220 via its wireless radio/antenna 214 and receives information/signal from the interfaces 220 when authorized. For example, the wireless radio/antenna 214 transmits the unique identifier 216 to the interfaces 220 and then receives confirmation/authorization from the interfaces 220 for the proper use of the decal 200 under different conditions. In other embodiments, the interfaces 220 comprises one or more of interfaces such as, for example, admin interface 222 including parking authority admin interface, enforcement interface 224 including police enforcement interface, computing device interface 226 including mobile device interface owned by the user or a third-party, vehicle interface 228 which allows the decal 200 to access data related to the user's vehicle, and other interfaces 230 described below.

In further embodiments, the other interfaces 230 comprise one or more of interfaces such as, for example, parking meters interface 232, fuel pumps interface 234, additional vehicles interface 236 which allows the decal to access data related to vehicles other than the vehicle the user is using, car wash interface 238, drive thru interface 240, toll roads interface 242, and further interfaces 244. In some embodiments, the decal 200, through its processor 210 and wireless radio/antenna 214, exchanges information with the interfaces 220 and seeks authorization to complete transactions with one or more of admin agent/agency, enforcement agent/agency, computing device, user's vehicle or other's vehicles, parking meters, fuel pumps, car wash service, drive thru service, toll road service and other permission-required services associated with the use of the user's vehicle.

In other embodiments, the interfaces 220 communicate with a central database 250 during the authentication process. Generally speaking, the central database 250 is located remotely, but, in some cases, allows a local copy of the central database 250 to be downloaded into a device of the user including the user's mobile device and the user's vehicle. In some embodiments, the central database 250 comprises one or more databases such as a decal configurations central database 252 storing configurations data related to decals, a user data central database 254 storing user information related to each authorized user, and other data central database 256 storing data other than decal configurations and user information data.

In some embodiments, the central database 250 communicates with other databases 260 including one or more databases such as, for example, hospital database 262 to check user's medical conditions/records, DMV database 264 to check user's driving records and/or authorized parking status, and other data sources 266 for data associated with the user and/or user's vehicle. Generally speaking, the other databases 260 are located remotely, but allow a local copy of the other databases 260 to be downloaded into a device of the user including the user's mobile device and the user's vehicle. Further descriptions of embodiments of the decal and its operations are found elsewhere in this disclosure.

Figure 3:
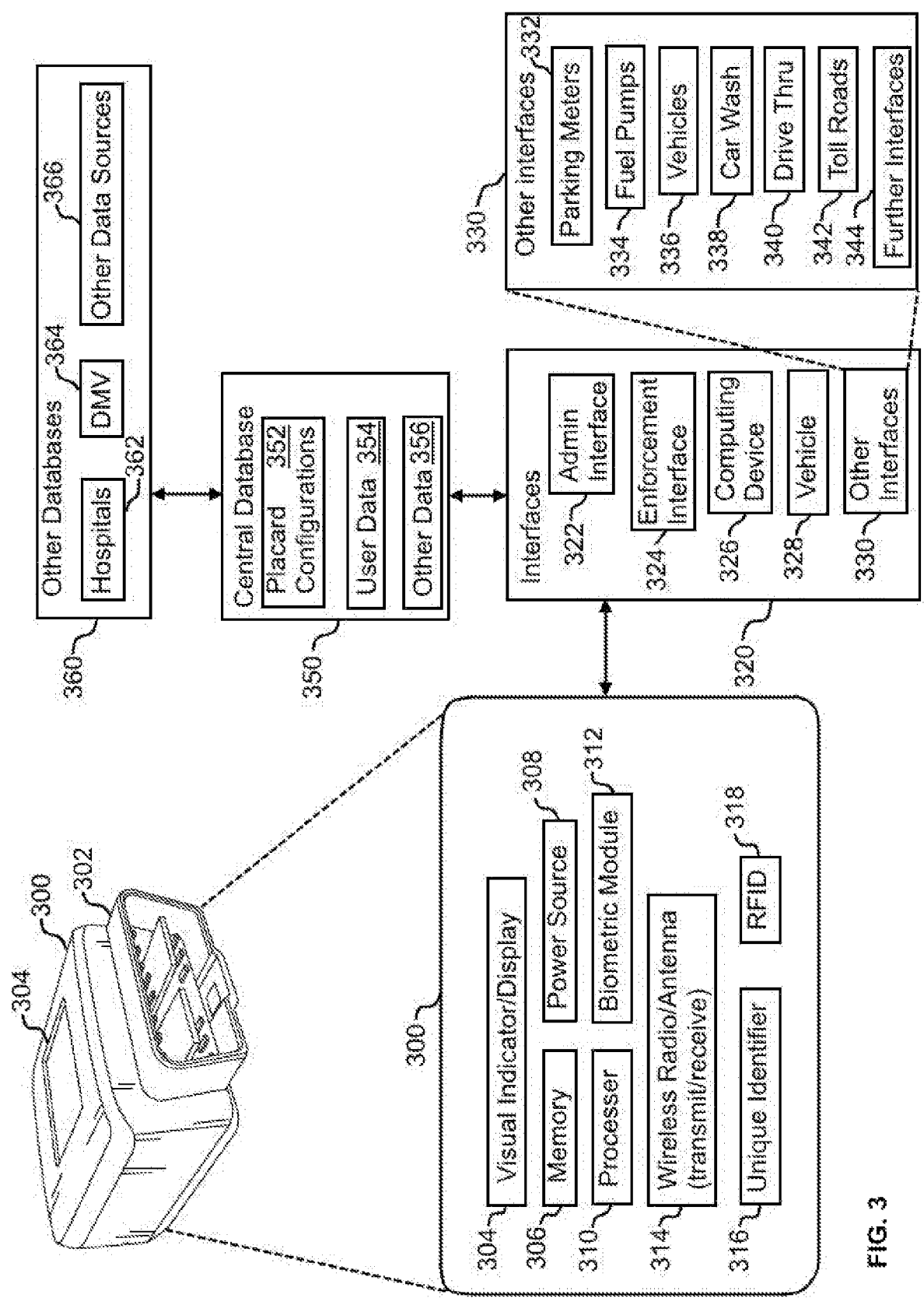
FIG. 3 shows still another non-limiting example of a user authorization system described herein; in this case, a plug-in device, and an exemplary functional block diagram.

In some embodiments, the user authentication system is a plug-in device that is plugged into a port of a vehicle. In certain embodiments, the user authentication system is a plug-in device 300 as shown in FIG. 3. Referring to FIG. 3, in some embodiments, the plug-in device 300 comprises an interface/connector 302 which is an On-Board Diagnostics Type 2 (OBD-II) interface. The interface/connector 302 can connect with the electronic system of the vehicle via a connection at a port of the vehicle, such as an OBD-II port/connector. Such connection allows data transmission between the plug-in-device 300 and the vehicle electronic system.

In some embodiments, the plug-in device 300 comprises a visual indicator or a display 304, which is configured to provide a counter indicating the time remaining in the current parking period, or to provide an indicator of the authenticity of the plug-in device to be used under the current conditions, or to provide an indicator of the validity of the plug-in device, the identity of an authorized user of the plug-in device, restrictions on the privileges to use the plug-in device, or a combination thereof. The visual indicator/display 304 is placed on any outer surface of the plug-in device 300. In some embodiments, the plug-in device 300 comprises a power source 308, which, in some embodiments, comprise a solar panel (not shown). In some embodiments, the power source 308 is battery powered and the battery is a rechargeable battery. In other embodiments, the power source 308 is wirelessly charged. For example, in some embodiments, the power source 308 allows an electromagnetic field to transfer power from a transmitting source to the power source 308 or a battery (not shown). In further embodiments, the power source 308 is connected to the vehicle to allow the plug-in device to receive energy from the vehicle. In some embodiment, the plug-in device 300 comprises a memory 306 and a processor 310, which, for example, records information, operates other components of the plug-in device 300, and communicates with external devices. In some embodiments, the plug-in device 300 comprises a biometric module 312, which is configured to verify the identity of an authorized user and, upon verification, activate the plug-in device for a parking period or other authorized operations. In some embodiments, the biometric module 312 is built into the processor 310. In some embodiments, the biometric module 312 is stored in or transmitted from interfaces other than the plug-in device 300. For example, in some embodiments, the biometric module 312 is stored in a computing device, including the user's mobile device such as a cell phone, and, in other embodiments, the biometric module 312 is stored in the electronic system of the user's vehicle.

In some embodiments, the plug-in device 300 comprises a wireless radio or antenna 314, which transmits signals to and receive signals from external devices, including, for example, various interfaces described elsewhere. In some embodiments, the transmission is wireless communications. For example, in some embodiments, the wireless communications are enabled by near-field communication (NFC), Bluetooth, Wi-Fi, Global System for Mobile communications (GSM), Code Division Multiple Access (CDMA), Long-Term Evolution (LTE), cellular telephone, satellite, or other IP embedded wireless communications. In other embodiments, the external device is a parking meter, a vehicle sensor, traffic/red-light cameras, traffic lights or other city infrastructure, a mobile device (such as a smart phone), wireless technology embedded in the vehicle itself, city wireless infrastructure including, for example, Wi-Fi networks, mesh networks, Low-Power Wide-Area Network (LPWAN) or Low-Power Network (LPN), or other proprietary wireless Internet of Things (IoT) networks. In further embodiments, the external device is a mobile device of the user. In some embodiments, the plug-in device 300 comprise a unique identifier 316 described elsewhere. In some embodiments, the plug-in device 300 comprises a passive RFID tag 318, which is configured to allow interrogation for the purposes of validation of the plug-in device.

In some embodiments, the plug-in device 300 communicates with interfaces 320 via its wireless radio/antenna 314 and receives information/signal from the interfaces 320 when authorized. For example, the wireless radio/antenna 314 transmits the unique identifier 316 to the interfaces 320 and then receives confirmation/authorization from the interfaces 320 for the proper use of the plug-in device 300 under different conditions. In other embodiments, the interfaces 320 comprises one or more of interfaces such as, for example, admin interface 322 including parking authority admin interface, enforcement interface 324 including police enforcement interface, computing device interface 326 including mobile device interface owned by the user or a third-party, vehicle interface 328 which allows the plug-in device 300 to access data related to the user's vehicle, and other interfaces 330 described below.

In further embodiments, the other interfaces 330 comprise one or more of interfaces such as, for example, parking meters interface 332, fuel pumps interface 334, additional vehicles interface 336 which allows the plug-in device to access data related to vehicles other than the vehicle the user is using, car wash interface 338, drive thru interface 340, toll roads interface 342, and further interfaces 344. In some embodiments, the plug-in device 300, through its processor 310 and wireless radio/antenna 314, exchanges information with the interfaces 320 and seeks authorization to complete transactions with one or more of admin agent/agency, enforcement agent/agency, computing device, user's vehicle or other's vehicles, parking meters, fuel pumps, car wash service, drive thru service, toll road service and other permission-required services associated with the use of the user's vehicle.

In other embodiments, the interfaces 320 communicate with a central database 350 during the authentication process. Generally speaking, the central database 350 is located remotely, but, in some cases, allows a local copy of the central database 350 to be downloaded into a device of the user including the user's mobile device and the user's vehicle. In some embodiments, the central database 350 comprises one or more databases such as a plug-in device configurations central database 352 storing configurations data related to plug-in devices, a user data central database 354 storing user information related to each authorized user, and other data central database 356 storing data other than plug-in device configurations and user information data.

In some embodiments, the central database 350 communicates with other databases 360 including one or more databases such as, for example, hospital database 362 to check user's medical conditions/records, DMV database 364 to check user's driving records and/or authorized parking status, and other data sources 366 for data associated with the user and/or user's vehicle. Generally speaking, the other databases 360 are located remotely, but, in some cases, allow a local copy of the other databases 360 to be downloaded into a device of the user including the user's mobile device and the user's vehicle. Further descriptions of embodiments of the plug-in device and its operations are found elsewhere in this disclosure.

Figure 4:
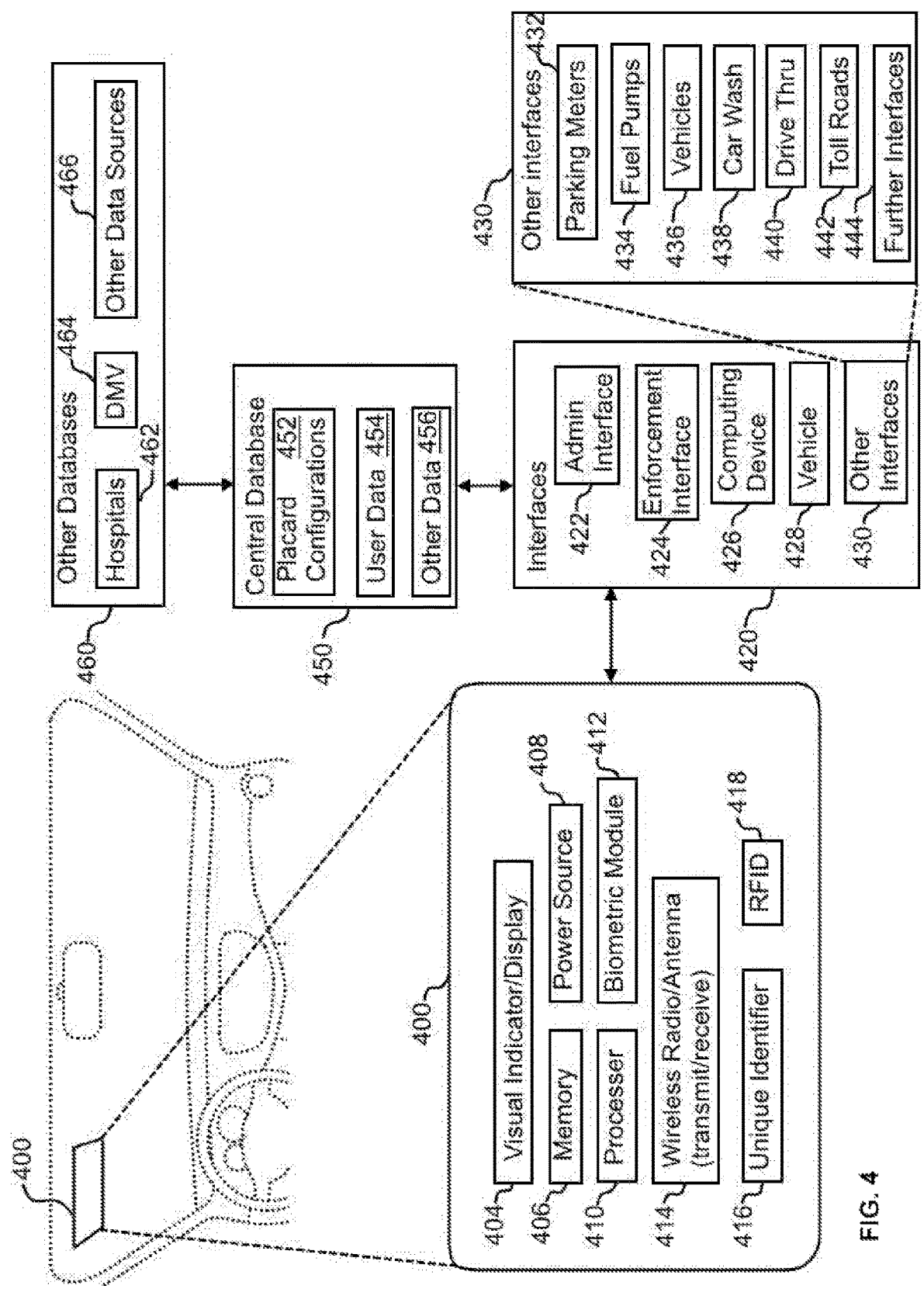
FIG. 4 shows another non-limiting example of a user authorization system described herein; in this case, a built-in vehicle interface, and an exemplary functional block diagram.

In some embodiments, the user authentication system is a built-in vehicle interface, such as, for example, a built-in vehicle interface built in the windshield, on the analog dashboard, as part of the instrument panel, as part of an interactive dashboard, or in any other parts of the vehicle. In certain embodiments, the user authentication system is a built-in vehicle interface 400 in the windshield as shown in FIG. 4. Referring to FIG. 4, in some embodiments, the built-in vehicle interface 400 comprises a visual indicator or a display 404, which is configured to provide a counter indicating the time remaining in the current parking period, or to provide an indicator of the authenticity of the built-in vehicle interface to be used under the current conditions, or to provide an indicator of the validity of the built-in vehicle interface, the identity of an authorized user of the built-in vehicle interface, restrictions on the privileges to use the built-in vehicle interface, or a combination thereof. In some embodiments, the built-in vehicle interface 400 comprises a power source 408. In certain embodiments, the power source 408, in some embodiments, comprises a solar panel. In some embodiments, the power source 408 is battery powered and the battery is a rechargeable battery. In other embodiments, the power source 408 is wirelessly charged. For example, in some embodiments, the power source 408 allows an electromagnetic field to transfer power from a transmitting source to the power source 408 or a battery (not shown). In some embodiments, the power source 408 is connected to the vehicle to allow the built-in vehicle interface 400 to receive energy from the vehicle. In some embodiment, the built-in vehicle interface 400 comprises a memory 406 and a processor 410, which, for example, records information, operates other components of the built-in vehicle interface 400, and communicates with external devices. In some embodiments, the built-in vehicle interface 400 comprises a biometric module 412, which is configured to verify the identity of an authorized user and, upon verification, activate the built-in vehicle interface for a parking period or other authorized operations. In some embodiments, the biometric module 412 is built into the processor 410. In other embodiments, the biometric module 412 is stored in or transmitted from interfaces other than the built-in vehicle interface 400. For example, in some embodiments, the biometric module 412 is stored in a computing device, including the user's mobile device such as a cell phone, and, in other embodiments, the biometric module 412 is stored in the electronic system of the user's vehicle.

In some embodiments, the built-in vehicle interface 400 comprises a wireless radio or antenna 414, which transmits signals to and receive signals from external devices, including, for example, various interfaces described elsewhere. In some embodiments, the transmission is wireless communications. For example, in some embodiments, the wireless communications are enabled by near-field communication (NFC), Bluetooth, Wi-Fi, Global System for Mobile communications (GSM), Code Division Multiple Access (CDMA), Long-Term Evolution (LTE), cellular telephone, satellite, or other IP embedded wireless communications. In some embodiments, the external device is a parking meter, a vehicle sensor, traffic/red-light cameras, traffic lights or other city infrastructure, a mobile device (such as a smart phone), wireless technology embedded in the vehicle itself, city wireless infrastructure including, for example, Wi-Fi networks, mesh networks, Low-Power Wide-Area Network (LPWAN) or Low-Power Network (LPN), or other proprietary wireless Internet of Things (IoT) networks. In further embodiments, the external device is a mobile device of the user. In some embodiments, the built-in vehicle interface 400 comprise a unique identifier 416 described elsewhere. In some embodiments, the built-in vehicle interface 400 comprises a passive RFID tag 418, which is configured to allow interrogation for the purposes of validation of the built-in vehicle interface.

In some embodiments, the built-in vehicle interface 400 communicates with interfaces 420 via its wireless radio/antenna 414 and receives information/signal from the interfaces 420 when authorized. For example, the wireless radio/antenna 414 transmits the unique identifier 416 to the interfaces 420 and then receives confirmation/authorization from the interfaces 420 for the proper use of the built-in vehicle interface 400 under different conditions. In other embodiments, the interfaces 420 comprises one or more of interfaces such as, for example, admin interface 422 including parking authority admin interface, enforcement interface 424 including police enforcement interface, computing device interface 426 including mobile device interface owned by the user or a third-party, vehicle interface 428 which allows the built-in vehicle interface 400 to access data related to the user's vehicle, and other interfaces 430 described below.

In further embodiments, the other interfaces 430 comprise one or more of interfaces such as, for example, parking meters interface 432, fuel pumps interface 434, additional vehicles interface 436 which allows the built-in vehicle interface to access data related to vehicles other than the vehicle the user is using, car wash interface 438, drive thru interface 440, toll roads interface 442, and further interfaces 444. In some embodiments, the built-in vehicle interface 400, through its processor 410 and wireless radio/antenna 414, exchanges information with the interfaces 420 and seeks authorization to complete transactions with one or more of admin agent/agency, enforcement agent/agency, computing device, user's vehicle or other's vehicles, parking meters, fuel pumps, car wash service, drive thru service, toll road service and other permission-required services associated with the use of the user's vehicle.

In other embodiments, the interfaces 420 communicate with a central database 450 during the authentication process. Generally speaking, the central database 450 is located remotely, but, in some cases, allows a local copy of the central database 450 to be downloaded into a device of the user including the user's mobile device and the user's vehicle. In some embodiments, the central database 450 comprises one or more databases such as a built-in vehicle interface configurations central database 452 storing configurations data related to built-in vehicle interfaces, a user data central database 454 storing user information related to each authorized user, and other data central database 456 storing data other than built-in vehicle interface configurations and user information data.

In some embodiments, the central database 450 communicates with other databases 460 including one or more databases such as, for example, hospital database 462 to check user's medical conditions/records, DMV database 464 to check user's driving records and/or authorized parking status, and other data sources 466 for data associated with the user and/or user's vehicle. Generally speaking, the other databases 460 are located remotely, but, in some cases, allow a local copy of the other databases 460 to be downloaded into a device of the user including the user's mobile device and the user's vehicle. Further descriptions of embodiments of the built-in vehicle interface and its operations are found elsewhere in this disclosure.

Figure 5:
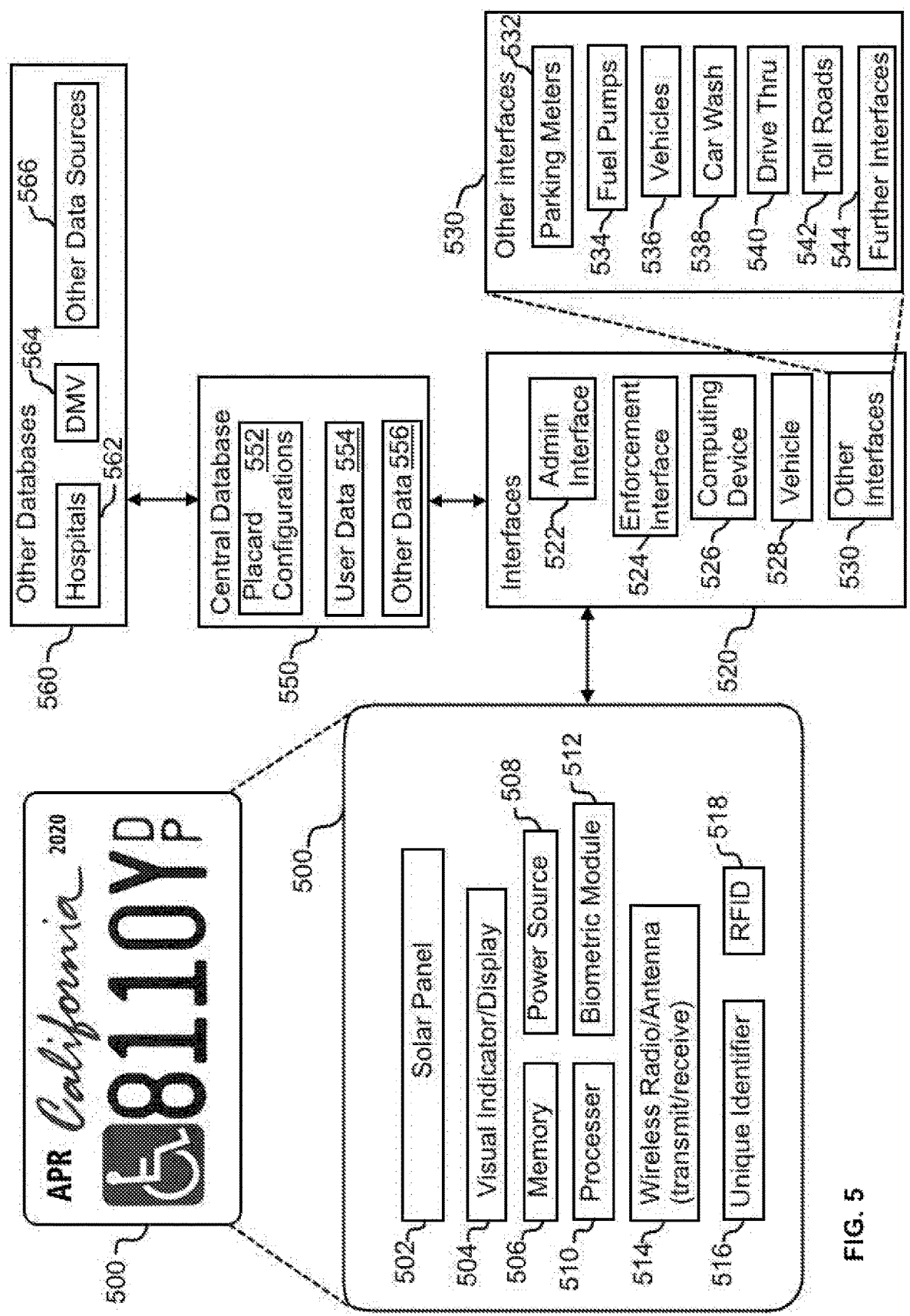
FIG. 5 shows another non-limiting example of a user authorization system described herein; in this case, a license plate, and an exemplary functional block diagram.

In some embodiments, the user authentication system is a license plate, such as, for example, an intelligent license plate. In certain embodiments, the user authentication system is a license plate 500 as shown in FIG. 5. Referring to FIG. 5, in some embodiments, the license plate 500 comprises a solar panel 502, to convert light into energy. In some embodiments, the license plate 500 comprises a visual indicator or a display 504, which is configured to provide a counter indicating the time remaining in the current parking period, or to provide an indicator of the authenticity of the license plate to be used under the current conditions, or to provide an indicator of the validity of the license plate, the identity of an authorized user of the license plate, restrictions on the privileges to use the license plate, or a combination thereof. In some embodiments, the license plate 500 comprises a power source 508, which, in some embodiments, is different from the solar panel 502, and in some embodiments, is the same as the solar panel 502. In some embodiments, the power source 508 is battery powered and the battery is a rechargeable battery. In other embodiments, the power source 508 is wirelessly charged. For example, in some embodiments, the power source 508 allows an electromagnetic field to transfer power from a transmitting source to the power source 508 or a battery (not shown). In some embodiment, the license plate 500 comprises a memory 506 and a processor 510, which, for example, records information, operates other components of the license plate 500, and communicates with external devices. In some embodiments, the license plate 500 comprises a biometric module 512, which is configured to verify the identity of an authorized user and, upon verification, activate the license plate for a parking period or other authorized operations. In some embodiments, the biometric module 512 is built into the processor 510. In other embodiments, the biometric module 512 is stored in or transmitted from interfaces other than the license plate 500. For example, in some embodiments, the biometric module 512 is stored in a computing device, including the user's mobile device such as a cell phone, and in other embodiments, the biometric module 512 is stored in the electronic system of the user's vehicle.

In some embodiments, the license plate 500 comprises a wireless radio or antenna 514, which transmits signals to and receives signals from external devices, including, for example, various interfaces described elsewhere. In some embodiments, the transmission is wireless communications. For example, in some embodiments, the wireless communications are enabled by near-field communication (NFC), Bluetooth, Wi-Fi, Global System for Mobile communications (GSM), Code Division Multiple Access (CDMA), Long-Term Evolution (LTE), cellular telephone, satellite, or other IP embedded wireless communications. In some embodiments, the external device is a parking meter, a vehicle sensor, traffic/red-light cameras, traffic lights or other city infrastructure, a mobile device (such as a smart phone), wireless technology embedded in the vehicle itself, city wireless infrastructure including, for example, Wi-Fi networks, mesh networks, Low-Power Wide-Area Network (LPWAN) or Low-Power Network (LPN), or other proprietary wireless Internet of Things (IoT) networks. In further embodiments, the external device is a mobile device of the user. In some embodiments, the license plate 500 comprises a unique identifier 516 described elsewhere. In some embodiments, the license plate 500 comprises a passive RFID tag 518, which is configured to allow interrogation for the purposes of validation of the license plate.

In some embodiments, the license plate 500 communicates with interfaces 520 via its wireless radio/antenna 514 and receives information/signal from the interfaces 520 when authorized. For example, the wireless radio/antenna 514 transmits the unique identifier 516 to the interfaces 520 and then receives confirmation/authorization from the interfaces 520 for the proper use of the license plate 500 under different conditions. In other embodiments, the interfaces 520 comprises one or more of interfaces such as, for example, admin interface 522 including parking authority admin interface, enforcement interface 524 including police enforcement interface, computing device interface 526 including mobile device interface owned by the user or a third-party, vehicle interface 528 which allows the license plate 500 to access data related to the user's vehicle, and other interfaces 530 described below.

In further embodiments, the other interfaces 530 comprise one or more of interfaces such as, for example, parking meters interface 532, fuel pumps interface 534, additional vehicles interface 536 which allows the license plate to access data related to vehicles other than the vehicle the user is using, car wash interface 538, drive thru interface 540, toll roads interface 542, and further interfaces 544. In some embodiments, the license plate 500, through its processor 510 and wireless radio/antenna 514, exchanges information with the interfaces 520 and seeks authorization to complete transactions with one or more of admin agent/agency, enforcement agent/agency, computing device, user's vehicle or other's vehicles, parking meters, fuel pumps, car wash service, drive thru service, toll road service and other permission-required services associated with the use of the user's vehicle.

In other embodiments, the interfaces 520 communicate with a central database 550 during the authentication process. Generally speaking, the central database 550 is located remotely, but, in some cases, allows a local copy of the central database 550 to be downloaded into a device of the user including the user's mobile device and the user's vehicle. In some embodiments, the central database 550 comprises one or more databases such as a license plate configurations central database 552 storing configurations data related to license plates, a user data central database 554 storing user information related to each authorized user, and other data central database 556 storing data other than license plate configurations and user information data.

In some embodiments, the central database 550 communicates with other databases 560 including one or more databases such as, for example, hospital database 562 to check user's medical conditions/records, DMV database 564 to check user's driving records and/or authorized parking status, and other data sources 566 for data associated with the user and/or user's vehicle. Generally speaking, the other databases 560 are located remotely, but allow a local copy of the other databases 560 to be downloaded into a device of the user including the user's mobile device and the user's vehicle. Further descriptions of embodiments of the license plate and its operations are found elsewhere in this disclosure.

In some embodiments, RFID 518 or other uniquely encrypted ID tag, such as, for example, a scannable encrypted image on the license plate 500, are used to validate the authenticity of the license plate and help catch violations using fraudulent or counterfeit license plates. In some embodiments, the electronically stored information by RFID 518 is interrogated by a device held by an enforcement agent, who checks the information against an official database for handicapped license plates. In other embodiments, the enforcement agent checks the medical certification, if there is any, associated with the license plate 500, and, in some cases, talks with the physician who authorized the medical certificate for updates on the driver's medical conditions or confirm with a hospital database storing such medical certificates. In some embodiments, this process of interrogating electronic information stored by RFID 518 and the ensuing validation is automatic without intervention from the enforcement agent. Only when a violation is found, the validation process will inform the enforcement agent to issue citations and make an official record of the violation.

In some embodiments, the user authentication system is a software-only solution contained within a vehicle navigation system of a vehicle. For this software-only solution, the credentials of the vehicle/driver/passenger, in some embodiments, are stored electronically and, in some embodiments, are accessed electronically with authorization from the user, an enforcement agent, including a policeman or a parking attendant. For example, when an enforcement agent queries the VIN or license plate of the vehicle with a mobile device, the enforcement agent can access such credentials associated with the user authentication system electronically so that he can compare the credentials against an enforcement database or healthcare database to confirm compliance from enforcement.

In other embodiments, the user authentication system is an embedded device in a vehicle. For example, the embedded device is installed on the instrument panel of the vehicle, on or in the windshield of a vehicle similar to or identical with the built-in vehicle interface 400, on the roof or floor of the vehicle, in or near the driver's seat, in or near the glove box, in or near the console, or in or near a car window, including a sun roof and/or moon roof. In further embodiments, a user authentication system alerts enforcement agents or agencies when an unauthorized person drives the vehicle either without the required credentials or with expired credentials.

In some embodiments, the user authorization system communicates with external devices or interfaces to allow for reduced or special rates due to the user's status, including the user's medical conditions and/or the user's handicapped parking status. In certain embodiments, the user authentication system automatically searches for and speaks to meters/sensors at a service site to receive such reduced or special rates. In other embodiments, the user presents the physical form of the user authentication system, such as, for example, a placard, a decal, a plug-in device, or a mobile application, etc., wherein the physical form displays or represents validation/authentication for the user's status. In some embodiments, the services applicable to reduced or special rates include but are not limited to, parking, gasoline purchase, car washes, and drive-thru food purchases (including fast food, prescription drug pick-ups, coffees, drinks, or raffles). In further embodiments, the services applicable include any service related to activities when a user parks his vehicle or conducts some transactions in his vehicle.

In some embodiments, the user authorization system comprises security badges. In some embodiments, the user authorization system comprises parking passes for commuters. In some embodiments, the user authorization system comprises tokens to operate driver-less vehicles.

User Authentication Method

In some embodiments, the methods, systems and platforms described herein include a user authentication method. In other embodiments, the user authentication method comprises detecting fraudulent use of privilege permits, including, for example, placards, hangtags, decals, permits, license plates, passes, badges, and plug-in devices. In some embodiments, the user authentication method comprises receiving information of a vehicle for which a user is seeking privileged transactions, such as, for example, free parking, discounted parking, discounted rate for services, and preferred treatment/status. In other embodiments, the user authentication method comprises receiving information of the user of the vehicle seeking privileged transactions, such as, for example, biometric data, health information, medical certificate information, insurance information, and driving record information, any of which is allowed by the user to transmit to enforcement agencies. In some embodiments, the user authentication method comprises sending received information, such as, for example, vehicle information and user information, to an enforcement agency including a server of an enforcement agency. In other embodiments, the user authentication method comprises comparing the received information of the vehicle and the user to data in a database of the enforcement agency or in other databases, and determining whether the user is authorized to enjoy the privilege he is seeking. In some embodiments, the user authentication method comprises detecting fraudulent of the vehicle by the user for the privilege he is seeking. In other embodiments, the user authentication method comprises alerting the enforcement agency to take further actions against the user who is seeking unauthorized privileges.

In some embodiments, the user authentication method is virtual, i.e., run by a computer after authorization by the user and without further intervention from the user. In other embodiments, the user authentication method is assisted by the user. In some embodiments, the user manually activates the user authentication method whenever the user seeks privileges to park or to make a transaction. In other embodiments, after the user activates the user authentication method, the method runs automatically while seeking privileges to park or to make a transaction unless the user stops the method from running. In some embodiments, the user authorizes a computer device, such as, for example, his vehicle, his mobile phone, RFID, and computer devices within the placard, hangtag, plug-in device, intelligent license plate, and badges, to broadcast information of the vehicle and the user to enforcement agencies. In some embodiments, the privileges sought are associated with and authorized according to each geographic area, such as a parking lot or a vehicle-associated service. In other embodiments, the privileges sought are geo-fenced, i.e., each privilege having a virtual geographic boundary defined by means of GPS or RFID technology, thereby enabling softwares to trigger a response when a computer device, such as a mobile device, enters or leaves the area. In this way, the authorized privileges, including parking privileges and discounted rate privileges, are automatically recognized when the user and his vehicle enter the geo-fenced parking lot or service provider. In some embodiments, the computer device notifies the user that he is in compliance with and entitled to the privilege within the geo-fenced location, together with other related information about the privilege. In other embodiments, the computer device notifies the user that he does not have certain privileges available within the geo-fenced location and other related information.

In some embodiments, an enforcement agent uses an enforcement device to interrogate vehicle information and user information broadcast by the computer device. In other embodiments, the enforcement device is an augmented reality glasses with real time access to the database of privilege permits, such as, for example, placards, hangtags, decals, permits, license plates, passes, badges, and plug-in devices. In some embodiments, when the enforcement agent views the display of a privilege permit, such as, for example, a placard, a hangtag, a decal, a license plate, a pass, and a badge through his augmented reality glasses, the augmented reality glasses interrogates vehicle information and user information broadcast by the privilege permit, compares the interrogated information against the database of privilege permits, and determines whether the vehicle or the user is abusing the privilege.

In some embodiments, the user authentication method comprises allowing a physician or a prescribing authority to confirm a user's request for privilege permit based on his medical conditions. In other embodiments, the physician or the prescribing authority makes the confirmation via an online service. In some embodiments, information, such as, for example, the user's biometric data and the medical confirmation or medical certificate, is captured and stored in a database, such as, for example, a hospital database, an insurance company's database, and the DMV database. In other embodiments, after receiving the user's biometric data, the vehicle information, and the medical certificate information, the DMV starts its process of confirmation for the request for privilege permit and issues the privilege permit if all requirements therefor are fulfilled. In some embodiments, the DMV mails the privilege permit, including, for example, a placard, a hangtag, a decal, a license plate, a pass, and a badge, to the authorized user. In other embodiments, a digital copy is sent to the user's email account, the user's vehicle software, the user's mobile phone, a smart phone app in the user's mobile phone, or other computer device associated with the user authentication process. In some embodiments, the user's vehicle is registered by a geo-fence database for its privileges.

Placard

In some embodiments, the methods, systems, and platforms described herein include a placard, or use of the same. In other embodiments, a placard includes, by way of non-limiting examples, a parking placard, a handicapped parking placard, a handicap parking placard, a disabled person parking card, a disability parking placard, and a disabled parking placard.

A handicapped parking placard is issued to a disabled person for their use in any vehicle being operated exclusively by or for the benefit of a person with disability and is sometimes only be used when those persons are actually being transported in the vehicle. A person eligible for handicapped parking placard includes those who, by way of non-limiting examples, is blind; does not have full use of an arm or both arms; cannot walk 200 feet without stopping to rest; cannot walk without use of, or assistance from, a brace, cane, crutch, another person, prosthetic device, wheelchair or other assistive device; is restricted by lung disease to such an extent the person's forced (respiratory) expiratory volume for one second, when measured by spirometry, is less than one liter or the arterial oxy tension is less than 60 MM/HG on room air at rest; uses portable oxygen; has a cardiac condition to the extent the person's functional limitations are classified in severity as Class III or Class IV according to the standards set by the American Heart Association; is severely limited in his or her ability to walk due to an arthritic, neurological or orthopedic condition; is in loco parentis of a person specified in one of the above mentioned disabilities; and has mobility problems that substantially impair a person's ability to move around; wherein problems are caused by, by way of non-limiting examples, paralysis, lung disease, cardiac deficiency, wheelchair confinement, arthritis, foot disorder, and other medical condition causing a person to use a brace, cane, crutch or other assistive device.

In some embodiments, a handicapped parking placard is for a person who has a permanent disability. In some embodiments, a handicapped parking placard is for a person who has a temporary disability. A handicapped parking placard allows a person to park, by way of non-limiting examples, in parking spaces with the International Symbol of Access (wheelchair symbol); next to a blue curb authorized for persons with disabilities parking. Next to a green curb (green curbs indicate limited time parking) for as long as you wish; in an on-street metered parking space at no charge; and in an area that indicates it requires a resident or merchant permit.

In other embodiments, a placard comprises a power source. In further embodiments, the power source comprises a battery. In further embodiments, the power source comprises a solar panel. In further embodiments, the power source comprises a wireless charging module. In other embodiments, a placard comprises a processor and a memory. In other embodiments, a placard is a hang tag. In further embodiments, a placard comprises a passive RFID tag, the tag configured to allow interrogation for the purposes of validation of the tag. In other embodiments, a placard is an adhesive decal. In other embodiments, the hang tag or a decal is affixed to the windshield or license plate of the vehicle. In other embodiments, other standard placard formats are utilized.

In some embodiments, a placard is thin, similar to that of currently used paper based placards. In other embodiments, a placard is suitable for use inside a vehicle. In further embodiments, a placard is made to withstand the environmental conditions inside of a vehicle. In further embodiments, a placard is water proof to prevent electronic short due to condensation.

In other embodiments, a placard comprises a wireless communications module configured to communicate a unique identifier to an external device, the identifier associated in an external database with placard information. In some embodiments, the wireless communications module is near-field communication (NFC) module, Bluetooth module, Wi-Fi module, Global System for Mobile communications (GSM) module, Code Division Multiple Access (CDMA) module, Long-Term Evolution (LTE) module, cellular telephone module, satellite module, or other IP embedded wireless communication modules. In some embodiments, the external device is a parking meter, a vehicle sensor, traffic/red-light cameras, traffic lights or other city infrastructure, a mobile device (such as a smart phone), wireless technology embedded in the vehicle itself, city wireless infrastructure including, for example, Wi-Fi networks, mesh networks, Low-Power Wide-Area Network (LPWAN) or Low-Power Network (LPN), or other proprietary wireless Internet of Things (IoT) networks. In further embodiments, the external device is a mobile device of the user. In some embodiments, the placard information comprises an indicator of the authenticity of the electronic handicapped parking placard, an indicator of the validity of the electronic handicapped parking placard, the identity of an authorized user of the electronic handicapped parking placard, restrictions on the handicapped parking privileges, or a combination thereof.

In other embodiments, a placard comprises a biometric verification module configured to verify the identity of an authorized user and upon verification activate the placard for a parking period. In other embodiments, a placard comprises a visual display configured to provide a counter indicating the time remaining in the current parking period.

In some embodiments, the use of more advanced technology and software on the placard would itself provide limitations on the ability to create counterfeit placards. In other embodiments, additional features like RFID and online validation via wireless handheld device would authenticate the placard in real time. In further embodiments, the authentication includes additional information on the person and/or vehicle to which the placard is intended.

In other embodiments, a placard, when authorized, can automatically read vehicle information, including, for example, the vehicle identification number (VIN), license plate, or other personal identifiers within or close to the vehicle. The personal identifiers are any information broadcast by any machines or any devices within or close to the vehicle, by the user, by the mobile device of the user, or by the vehicle of the user. In some cases, the vehicle of the user has access to a verification database storing verifications of authenticating and store the verification database locally, such as within or close to the vehicle. As a result, the placard would get validation locally, such as within or close to the vehicle, without the need to transmit to a central verification database remotely after the remote central verification database allows a local download of the central verification database or part thereof to the vehicle. In some cases, the verification database is a parking database, a DMV database, or a healthcare system database.

In other embodiments, when a user parks his vehicle at a parking meter, his placard, if displayed and visible, allows for free parking according to rules set by the parking authority. In some cases, the placard communicates with a meter or sensor nearby to receive reduced parking rate according to rules set by the parking authority based on the user's credentials. In some cases, the placard comprises a token that is a contactless payment form and allows for preference rates, special services, extra time limits, etc., according to the rules set by the parking authority. In some embodiments, the token is the placard itself, a removable piece of the placard, or an identifier on a mobile application. In some embodiments, the special services are preferential treatments related to gasoline purchases, car washes, or any preferences given to the user who parks or conducts transactions in his vehicle, including, for example, drive through fast food purchase, drive through prescription pickups, drive through coffee purchase, etc.

Unique Identifier

In some embodiments, the methods, systems, and platforms described herein include a unique identifier, or use of the same. A unique identifier (UID) is a numeric or alphanumeric string that is associated with a single entity within a given system. UIDs make it possible to address that entity, so that it can be accessed and interacted with. In some embodiments, a unique identified is associated with a parking placard.

In other embodiments, a unique identifier is wirelessly transmitted from an in-vehicle electronic handicapped parking placard and received by an external computing device. In other embodiments, input from a parking user verifying their identity is transmitted associated with a unique identifier. In other embodiments, the unique identifier and the input from the parking user are transmitted by the computing device to a central parking database.

In other embodiments, a wireless communications module is configured to communicate a unique identifier to an external application. In other embodiments, a software module configured to receive the unique identifier and use the identifier to query a central parking database for handicapped parking placard configuration data. In other embodiments, a software module is configured to receive the unique identifier and use the identifier to query a central parking database to enter or edit handicapped parking placard configuration data and renew or extend the validity of the placard.

In some embodiments, a unique identifier is obtained from one or more items selected from the identification list comprising driver's license, VIN, biometrics, license plate, Global Positioning System (GPS) data of the user's position, student photo ID, passport, passport card, DHS trusted traveler cards, military ID card, permanent resident card, employment authorization document card, governmentally issued or recognized photo ID, and airline or airport-issued ID. In some cases, a unique identifier comprises geospatial information, such as, for example, Global Positioning System (GPS) data which provides geolocation and time information of the user. If allowed by the rules of the authority, GPS data, together with other required credentials and/or forms of unique identifier, enable the validity of the special permission sought by the user. For example, there are certain locations and/or times in which the placard is valid. However, outside of those defined GPS borders or time frames, the placard is invalid.

Input

In some embodiments, the methods, systems, and platforms described herein include input from a parking user, or use of the same. In other embodiments, the input from the parking user is a personal identification number (PIN). In other embodiments, the input from the parking user is biometric data. In other embodiments, input from a parking user is received at a computing device verifying their identity. In other embodiments, a biometric verification module is configured to receive the biometric data input, verify the identity of an authorized user and upon verification activate the placard for a parking period. In further embodiments, the biometric data input is fingerprinting from a fingerprint scanner. In other embodiments, an input comprises other verification methodology completed via smart phone device, by way of non-limiting examples, such as Bluetooth or NFC, with a corresponding transmit/received capability on the placard. In other embodiments, the unique identifier and the input from the parking user is transmitted by a computing device to a central parking database.

Figure 6:
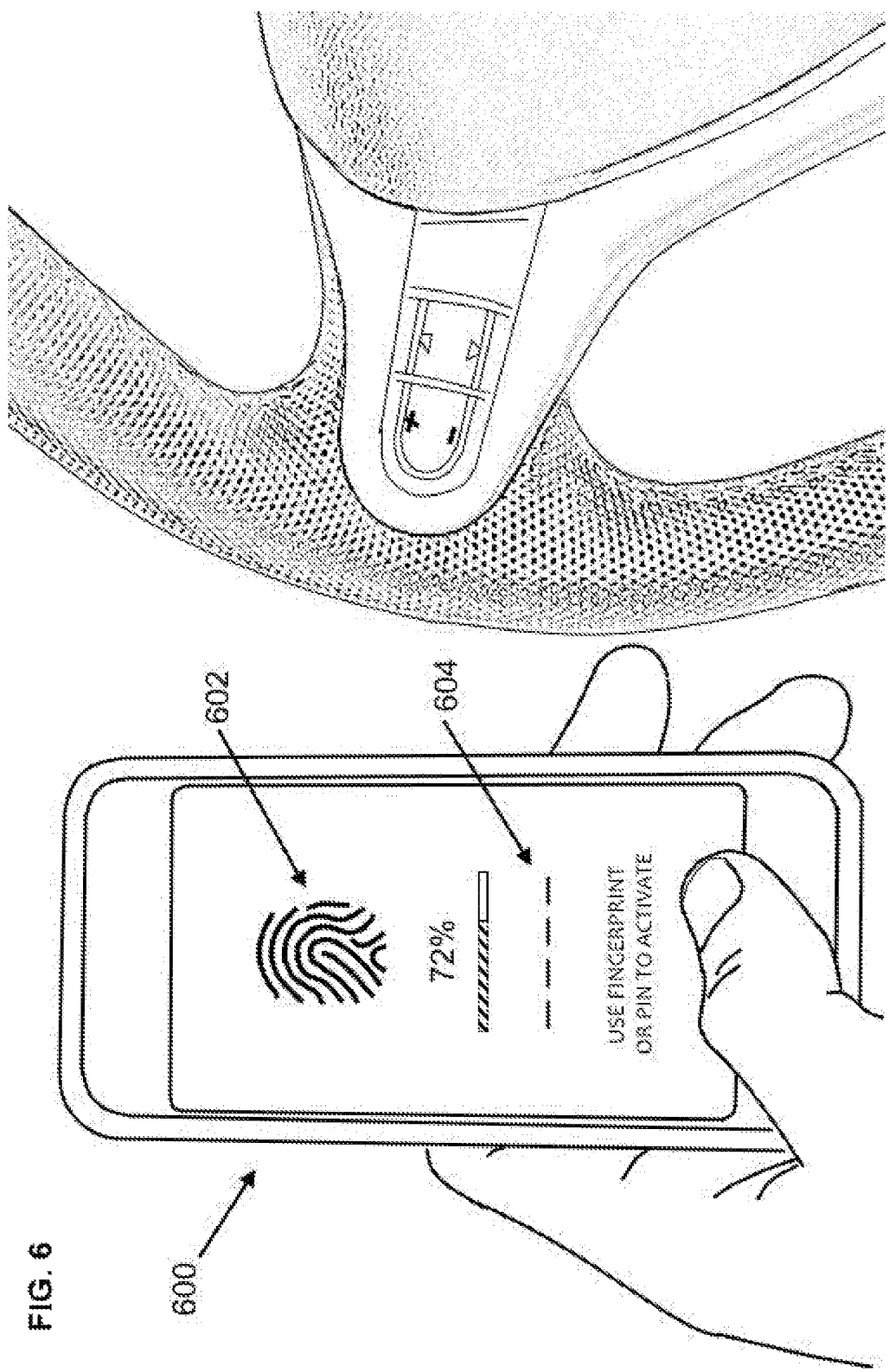
FIG. 6 shows a non-limiting example of a computer device described herein; in this case a smart phone, when a biometric verification process is running.

Referring now to FIG. 6, in some embodiments, a computing device is a mobile device, such as, a mobile phone, in particular, a smart phone 600. After parking, a user starts the biometric verification module in the smart phone 600. As shown in FIG. 6, the biometric data input can be either a fingerprint or a PIN, depending on the setup of the biometric verification module. In some embodiments, the biometric verification module displays the fingerprint detected 602 or the PIN recorded 604 based on the user inputs. Then the biometric verification module transmits the biometric data input detected, such as the fingerprint detected 602 and the PIN recorded 604, together with the unique identifier to a central parking database for user verification.

Figure 7:
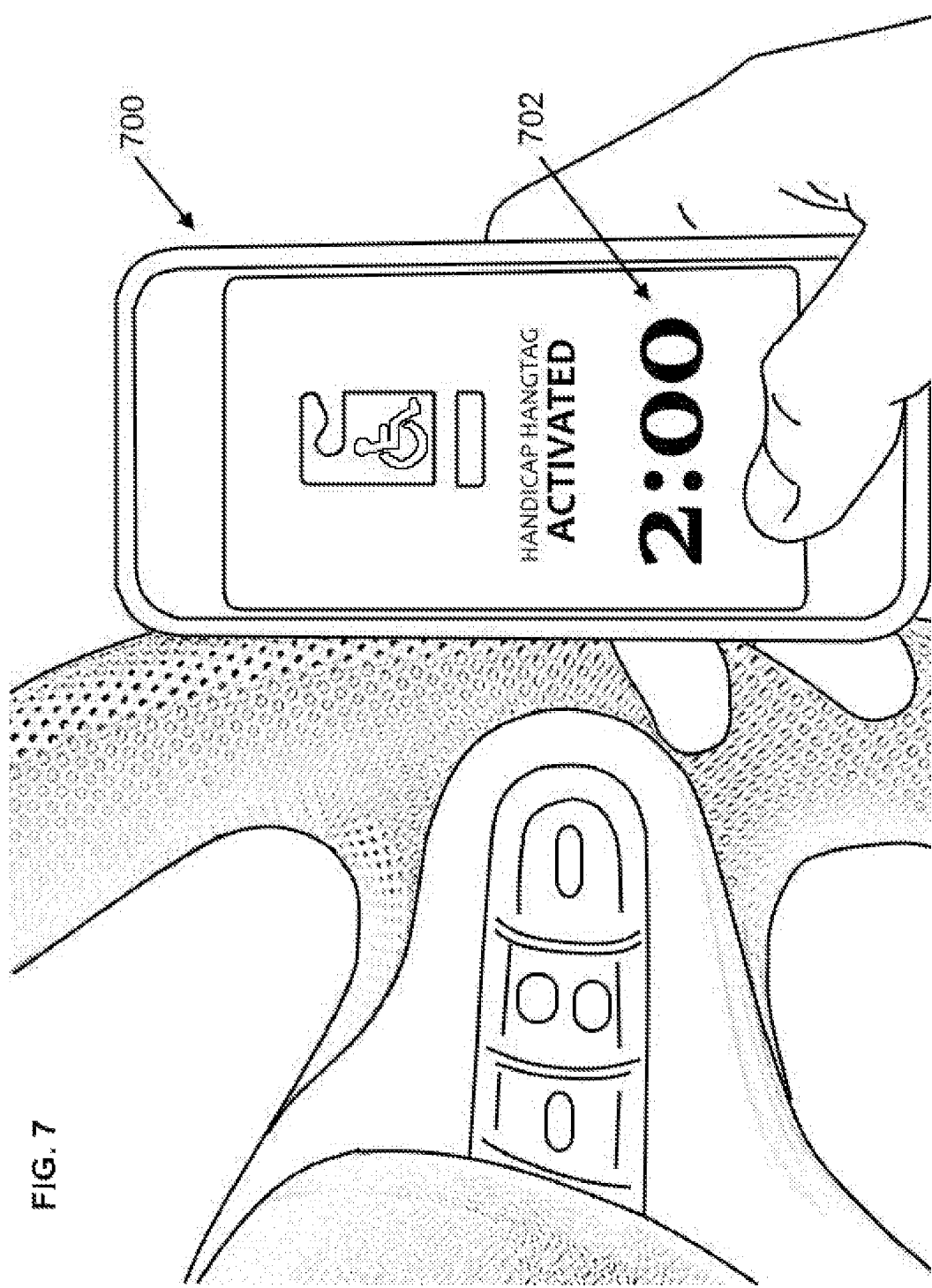
FIG. 7 shows a non-limiting example of a computer device described herein; in this case a smart phone, when a parking duration is displayed.

Turning now to FIG. 7, after the central parking database verifies the identity of the user and his parking privileges, the central parking database sends handicapped parking placard configuration data back to the computing device, such as, for example, a smart phone 700. The configuration data comprises, for example, restrictions of his parking privileges, such as a maximum parking duration 702 for the specific parking, which, in some embodiments, is displayed by the computer device such as the smart phone 700. In other embodiments, the computer device transmits the received handicapped parking placard configuration data to the parking meter or the placard. In further embodiments, similar to the above examples, the computer device transmits the handicapped parking configuration data to a user authentication system, such as, for example, a decal, a hang tag, a bracelet, a token, an embedded device in a vehicle, and a software-only solution.

Placard Configuration Data

In some embodiments, the methods, systems, and platforms described herein include placard configuration data, or use of the same. In further embodiments, handicapped parking placard configuration data is received by the computing device from the central parking database in response to the transmission. In other embodiments, the placard configuration data comprises, by way of non-limiting examples, one or more of: verification of the authenticity of the electronic handicapped parking placard, validation of the electronic handicapped parking placard, the identity of the authorized parking user, and restrictions on the handicapped parking privileges.

In other embodiments, a parking user application comprises a software module configured to receive the unique identifier and use the identifier to query a central parking database to enter or edit handicapped parking placard configuration data and renew or extend the validity of the placard. In other embodiments, a parking enforcement application comprises a software module configured to receive the unique identifier and use the identifier to query a central parking database for handicapped parking placard configuration data.

Visual Display

In some embodiments, the methods, systems, and platforms described herein include a visual display, or use of the same. In other embodiments, handicapped parking placard configuration data is received by the computing device from the central parking database in response to the transmission. In other embodiments, the visual display is activated on an electronic handicapped parking placard. In other embodiments, the visual display is activated by the computing device. In other embodiments, the visual display is configured to provide a counter indicating the time remaining in a current parking period.

In other embodiments, a placard is activated through the use of a visual display with counter. In other embodiments, a placard is color coded to be Green (valid) or Red (max time reached) based on the data received by the parking enforcement application. In other embodiments, within the duration of a permit itself, the visual display and/or a separate time limited circuit with display are used to permanently display VOID or other expiration description or colors when the placard itself has exceeded its intended life span by the issuing entity.

Parking User Application

In some embodiments, the methods, systems, and platforms described herein include a parking user application, or use of the same. In other embodiments, a parking user application comprises a software module configured to receive the unique identifier and use the identifier to query a central parking database to enter or edit handicapped parking placard configuration data and renew or extend the validity of the placard. In other embodiments, a parking user application receives input from a parking user verifying their identity. In other embodiments, the parking user application is executed on a mobile device of a parking user.

Parking Enforcement Application

In some embodiments, the methods, systems, and platforms described herein include a parking enforcement application, or use of the same. In other embodiments, a parking enforcement application comprises a software module configured to receive the unique identifier and use the identifier to query a central parking database for handicapped parking placard configuration data, the data comprising one or more of: verification of the authenticity of the electronic handicapped parking placard, validation of the electronic handicapped parking placard, the identity of the authorized parking user, and restrictions on the handicapped parking privileges. In other embodiments, a parking enforcement application is executed on a parking meter. In other embodiments, a parking enforcement application is executed on a mobile device of a parking enforcement officer.

In some embodiments, a parking enforcement application is used to identify the user of a placard is the originally intended user. In further embodiments, this identification is achieved by fingerprint recognition or a PIN to be incorporated directly into the placard or other personal identification methodology. In further embodiments, upon activation, it will enable the placard to be active for a max period to be defined or to initiate a counter with visual display that will be used to determine if max time has been exceeded. In further embodiments, the fingerprint, PIN or other verification methodology is completed via smart phone device, by way of non-limiting examples, such as Bluetooth or NFC, with a corresponding transmit/received capability on the placard. In other embodiments, it also provides a methodology by which the placard is legally renewed and extended. In further embodiments, it uses a smart phone device with such communication integration to update the operating parameters of the placard.

In other embodiments, a parking enforcement application is used to confirm that a placard is used within a valid duration time. In further embodiments, a parking enforcement application reads restrictions on the handicapped parking privileges. In further embodiments, during a parking stay, the received data is used to check the parking duration validity.

In other embodiments, a placard is activated through the use of a visual display with counter. In other embodiments, a placard is color coded to be Green (valid) or Red (max time reached) based on the data received by the parking enforcement application. In other embodiments, within the duration of a permit itself, the visual display and/or a separate time limited circuit with display are used to permanently display VOID or other expiration description or colors when the placard itself has exceeded its intended life span by the issuing entity. In further embodiments, this void state is permanent. In other embodiments, this void state is reset by the issuing entity.

In other embodiments, for a $3^{rd}$ party validation, a placard has a passive RFID capability embedded which is interrogated by the $3^{rd}$ party device to validate the placard. In further embodiments, the validation of this sort is accomplished by simply entering the serial number of the placard that is visibly written. In other embodiments, RFID provides additional capability to validate based on a more sophisticated static data string algorithm. In other embodiments, RFID provides additional capability to validate via the $3^{rd}$ party device wirelessly to a database. In further embodiments, the RFID embedment is visible. In other embodiments, the RFID embedment is hidden.

In other embodiments, a parking enforcement application is used to prevent counterfeit placards. In further embodiments, the use of more advanced technology and software on the placard would itself provide limitations on the ability to create counterfeit placards. In other embodiments, additional features like RFID and online validation via wireless handheld device would authenticate the placard in real time.

In further embodiments, the authentication includes additional information on the person and/or vehicle to which the placard is intended.

Digital Processing Device

In some embodiments, the methods, systems, and platforms described herein include a digital processing device, or use of the same. In further embodiments, the digital processing device includes one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® PS3®, Sony® PS4®, Microsoft® Xbox 360®, Microsoft Xbox One, Nintendo® Wii °, Nintendo® Wii U°, and Ouya®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Non-Transitory Computer Readable Storage Medium

In some embodiments, the methods, systems, and platforms disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the methods, systems, and platforms disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C #, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Web Browser Plug-in

In some embodiments, the computer program includes a web browser plug-in. In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called mircrobrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony PSP™ browser.

Software Modules

In some embodiments, the methods, systems, and platforms disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the methods, systems, and platforms disclosed herein include one or more databases, or use of the same. In view of the disclosure provided herein, those of skill in the art will recognize that many databases are suitable for storage and retrieval of user and parking information. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

EXAMPLES

The following illustrative examples are representative of embodiments of the software applications, systems, and methods described herein and are not meant to be limiting in any way.

Example 1—a Retiree's Usage of her Handicapped Parking Placard

Alice, a 65-year-old retiree with knee problems, has applied for and is issued a handicapped parking placard expired in two years. This computer-implemented handicapped parking placard comprises a power source, a processor and a memory. When Alice goes to a shopping mall, she parks her car in a parking space for the disabled. A unique identifier transmitted from the electronic handicapped parking placard in her car, and is received by a computing device (such as a parking meter) in the parking space. Alice sends in an input with her personal identification number (PIN). Instead, sometimes Alice chooses to send in an input of her fingerprint through a fingerprint scanner. A computing device then receives this PIN or fingerprint input verifying Alice's identity.

The computing device transmits the unique identifier and the input from the parking user to a central parking database, which in turn sends handicapped parking placard configuration data back to the computing device. The configuration data comprises one or more of: verification of the authenticity of the electronic handicapped parking placard, validation of the electronic handicapped parking placard, the identity of the authorized parking user, and restrictions on the handicapped parking privileges. If the maximum parking duration for this specific parking is 2 hours, upon the verification of Alice's identify, her placard is activated for a parking period of 2 hours. In the meantime, a visual display, which is configured to provide a counter indicating the time remaining in a current parking period, is activated by the computing device onto the electronic handicapped parking placard.

A parking enforcement application is executed on a parking meter or on a mobile device of a parking enforcement officer. The parking enforcement application comprising a software module configured to receive the unique identifier and use the identifier to query a central parking database for handicapped parking placard configuration data. The parking enforcement application is used to identify the user of the placard is truly Alice by verifying the input through the fingerprint, PIN or other verification methodology. A user other than Alice who somehow possesses Alice's placard cannot provide the needed identification input.

In addition, the parking enforcement application reads restrictions on Alice's handicapped parking privileges to confirm that her placard is used within a valid duration time. Alice's placard is activated through the use of a visual display with counter, and is color coded to be Green (valid) or Red (max time reached) based on the data received by the parking enforcement application. Hence, when the 2-hour period expires, the placard will turn from Green to Red, and the parking enforcement officer can tell the status of Alice's parking duration.

Furthermore, within the duration of Alice's parking permit itself, the visual display and/or a separate time limited circuit with display are used to permanently display VOID or other expiration description or colors when the placard itself has exceeded its intended life span by the issuing entity. If Alice's parking placard has passes its allowed two-year parking period, the VOID sign is displayed on her placard so that it can no longer be used. Sometimes, this void state is permanent. Sometimes, this void state is reset by the issuing entity when Alice applies to renew her parking placard.

Additionally, the parking enforcement application is used to prevent counterfeit placards. Additional features like RFID and online validation via wireless handheld device would authenticate the placard in real time. If instead, Alice does not have a valid parking placard and only has a counterfeit placard, this counterfeit placard cannot pass the parking enforcement application.

Example 2—an Injured Athlete's Usage of his Plug-in Device

College athlete David suffers from a torn anterior cruciate ligament (ACL) and undergoes an ACL reconstruction surgery. After the surgery, David needs to use crutches, limit physical activity, wear a full-leg brace for 4 to 6 weeks, and rehabilitate for a year. As a result of his physical conditions, he has applied for and is issued a handicapped parking permit for 12 months.

When applying for the handicapped parking permit at the DMV, David also inputs his biometric information such as his fingerprints and a PIN for verification purposes while using the plug-in device. After the application is approved, David's parking privilege associated with him and his vehicle is stored in the DMV's databased. Because David's vehicle is equipped with an OBD-II port, once the handicapped parking permit is issued by DMV, the DMV gives David a formatted plug-in device associated with the handicapped parking permit. The DMV database also saves the plug-in device configuration data for the parking permit.

This plug-in device comprises an OBD-II interface, a visual display, and a power source. The OBD-II interface connects with the electronic system of the vehicle when plugged into the OBD-II port. The visual display flashes a green light when David's vehicle parked at a parking space without violating any parking rules/regulations, and flashes a red light when his car parked illegally. In some cases, the power source is a battery. In other cases, the power source is connected to the car battery. In still other cases, the power source stores the energy generated by the solar panel of the plug-in device.

When David goes to a rehabilitation center, he parks his car in a parking space for the disabled. A unique identifier transmitted from the plug-in device on his car via a wireless radio, and is received by a computing device (such as a parking meter) in the parking lot. The computing device sends an inquiry to a biometric module of the plug-in device. The biometric module activates a program in David's cell phone and requires a finger print of David or a PIN number, both of which have been recorded and saved by the DMV database when the handicapped parking permit was issued. David types in his PIN which is received by the computing device for verification purposes. Sometimes, David chooses to send in an input of his fingerprint through a fingerprint scanner on his cell phone. If approved for parking, the cell phone displays the parking time remaining.

The computing device then transmits the received PIN or fingerprints together with the unique identifier to a central parking database, which communicates with the DMV database containing David's PIN and fingerprint record and which sends the plug-in device configuration data back to the computing device. The configuration data comprise one of more of verification of the authenticity of the handicap parking permit, validation of the handicapped parking permit, the identity of the authorized parking user, qualification for special discount for parking, and restrictions on the handicapped parking privileges. If the maximum parking duration for this specific parking is 1 hour, upon the verification of David's identify, his plug-in device is activated for a parking period of 1 hour. In the meantime, the visual display on the plug-in device starts blinking green during the remaining 1 hour of parking. In some cases, the visual display displays the remaining time.

A parking enforcement application is executed on a parking meter or on a mobile device of a parking enforcement officer or of a patrolling policeman. The parking enforcement application comprises a software module configured to receive the unique identifier from the plug-in device and use the unique identifier to query a central parking database for plug-in device configuration data. The parking enforcement application is used to confirm that the user of the plug-in device is truly David by verifying the input through the fingerprint, PIN or other verification methodology. In some cases, the parking enforcement application detects vehicles using handicapped parking lots, communicates with the plug-in device of such a vehicle if the device is available, retrieves unique identifier from each plug-in device involved, identifies users whose unique identifiers do not qualify for or associated with a handicapped parking status in the DMV database or who are not the legitimate user of each plug-in device according to the fingerprint, PIN or other verification methodology, and alerts the parking enforcement officer or patrolling policeman to take action.

In addition, the parking enforcement application automatically alerts the parking enforcement officer or patrolling policeman when a properly parked vehicle exceeds its allowed or valid parking duration according to its handicapped parking privileges. For example, although the visual display on the plug-in device is initially green, indicating a proper use, the visual display turns red or flashes the word "Expired" after the 1-hour parking privilege expires. In some cases, a visual check for the color or word displayed on the visual display of the plug-in device allows the parking enforcement officer or the patrolling policeman to tell the status of David's parking duration. In some cases, a visual display of a forfeited plug-in device does not respond to testing commands sent from the parking enforcement application, thereby allowing the enforcement officer or patrolling policeman to quickly identify violators of handicapped parking privileges. For example, the testing command is a command to cause the visual display to display an orange color or to display the word "Authorized". In some cases, additional features like RFID and online validation via wireless handheld device would authenticate the plug-in device in real time. If David does not have a valid plug-in device and only has a counterfeit version thereof, the counterfeit plug-in device would not pass the parking enforcement application. In some cases, an illegally parking vehicle with a plug-in device automatically sends a GPS signal to the enforcement agency when triggered. In other cases, the plug-in device reads vehicle information, such as the vehicle identification number, insurance policy number, plate number, etc., when authorized by David; these information are available to authorized agencies such the police or the insurance company.

In some cases, the plug-in device comprises a GPS sensor, a memory and a processor. The memory comprises a copy of the parking permit and the plug-in device configuration. The parking permit comprises a local database of permitted parking spaces for David's vehicle based on the GPS coordinates of the parking space. When David parks the car, the processor of the plug-in device reads the GPS coordinates, compares the reading to the stored GPS coordinates of permitted parking spaces. If a match is found, a status of allowing parking is assigned to the vehicle for the allowable parking duration. If a match is not found, a warning signal such as the words "Not Allowed" display on the visual display and an alert is sent to David and the parking enforcement authority. In some cases, if a match is not found, the processor continues to search for discounted parking rates for users in David's condition, communicates with the computer device of the parking meter, and pays the required parking fees accordingly, sometimes from an online bank account or a credit card associated with David.

Furthermore, if the handicapped parking permit associated with David's plug-in device expires or is revoked by the issuing authority, the visual display present a specific color or the word "Expired" to alert both David and the enforcement agents for possible violations. Once receiving such an alert, the computing device sends an alert email or message to David's cell phone. The specific color or the word "Expired" on the visual display of the plug-in device is reset by the issuing entity when David fulfills the requirement of renewing.

In some cases, if the parking privileges expired or nonexistent, the plug-in device broadcast a warning signal through its wireless radio or antenna. When a parking enforcement agent drives by wearing augmented reality glasses which receive the warning signal. The parking enforcement agent is alerted and, following the information provided by the warning signal, drives to the vicinity of vehicle violating parking rules.

Example 3—a Patient's Usage of his Built-in Vehicle Interface

High school teacher Jennifer suffers from a cardiac disease which results in marked limitation of her physical activities. Although she feels comfortable at rest most of the time, some activities, such as walking, jogging and carrying heavy objects, would cause fatigue, palpitation, dyspnea, or anginal pain. She goes to her family doctor for an annual checkup, during which her doctor diagnoses her cardiac disease which qualifies Jennifer for handicapped parking permit from DMV. The doctor records Jennifer's physical conditions and diagnosis in the hospital's database, then records the same information in the DMV's database for users who qualify for handicapped parking permits. After imputing her vehicle information while applying for the handicapped parking permit online, Jennifer also inputs her biometric information such as her fingerprints and a PIN for verification purposes while using the handicapped parking permit. After the application is approved, Jennifer's parking privilege associated with Jennifer and her vehicle is stored in the DMV's databased. Because Jennifer's vehicle is a smart car equipped with a built-in vehicle interface, once the handicapped parking permit is issued by DMV and with the permission given by Jennifer, DMV activates and authenticate the built-in interface in Jennifer's smart car with a handicapped parking permit for her use of the vehicle. In some cases, the built-in vehicle interface is activated by a code or email message sent by the DMV. In some cases, the built-in vehicle interface automatically connects with the DMV, and downloads the built-in vehicle interface configuration after the approval of the handicapped parking permit. The DMV database also saves the built-in interface configuration data for the parking permit.

This built-in vehicle interface comprises a solar panel, a visual indicator, and a power source. The solar panel converts sunlight into energy. The visual indicator flashes a green light when Jennifer's car parked at a parking space without violating any parking rules/regulations, and flashes a red light when his car parked illegally. In some cases, the power source is a battery. In other cases, the power source is connected to the car battery. In still other cases, the power source stores the energy generated by the solar panel of the built-in interface. In some cases, the power source allows the built-in vehicle interface to be wirelessly charged, such as, when parking at a special charging station for wireless charging.

When Jennifer goes to a shopping center, she parks her car in a parking space for the disabled. A unique identifier transmitted from the built-in vehicle interface on her car via a wireless radio, and is received by a computing device (such as a parking meter) in the parking lot. The computing device sends an inquiry to a biometric module of the built-in interface. The biometric module activates a program in Jennifer's cell phone and requires a finger print of Jennifer or a PIN number, both of which have been recorded and saved by the DMV database when the handicapped parking permit was issued. Jennifer types in her PIN which is received by the computing device for verification purposes. Sometimes, Jennifer chooses to send in an input of her fingerprint through a fingerprint scanner.

The computing device then transmits the received PIN or fingerprints together with the unique identifier to a central parking database, which communicates with the DMV database containing Jennifer's PIN and fingerprint record and which sends the built-in interface configuration data back to the computing device. The configuration data comprise one of more of verification of the authenticity of the handicap parking permit, validation of the handicapped parking permit, the identity of the authorized parking user, and restrictions on the handicapped parking privileges. If the maximum parking duration for this specific parking is 2 hours, upon the verification of Jennifer's identify, her built-in vehicle interface is activated for a parking period of 2 hours. In the meantime, a visual indicator on the built-in interface starts blinking green during the remaining 2 hours of parking.

A parking enforcement application is executed on a parking meter or on a mobile device of a parking enforcement officer or of a patrolling policeman. The parking enforcement application comprises a software module configured to receive the unique identifier from the built-in vehicle interface and use the unique identifier to query a central parking database for built-in vehicle interface configuration data. The parking enforcement application is used to identify the user of the built-in vehicle interface as truly Jennifer by verifying the input through the fingerprint, PIN or other verification methodology. In some cases, the parking enforcement application detects vehicles using handicapped parking lots, communicates with the built-in interface of a vehicle if available, retrieves unique identifier from each vehicle, identifies users whose unique identifiers do not qualify for or associated with a handicapped parking status in the DMV database or who are not the legitimate user of each built-in vehicle interface according to the fingerprint, PIN or other verification methodology, and alerts the parking enforcement officer or patrolling policeman to take action.

In addition, the parking enforcement application automatically alerts the parking enforcement officer or patrolling policeman when a properly parked vehicle exceeds its allowed or valid parking duration according to its handicapped parking privileges. For example, although the visual display on the built-in vehicle interface is initially green, indicating a proper use, the visual display turns red after the 2-hour parking privilege expires. In some cases, a visual check for the color of the visual display on the built-in vehicle interface allows the parking enforcement officer or the patrolling policeman to tell the status of Jennifer's parking duration. In some cases, a visual display of a forfeited built-in vehicle interface does not respond to testing commands sent from the parking enforcement application, thereby allowing the enforcement officer or patrolling policeman to quickly identify violators of handicapped parking privileges. For example, the testing command is a command to cause the visual display to blink at a predetermined frequency. In some cases, additional features like RFID and online validation via wireless handheld device would authenticate the built-in interface in real time. If Jennifer does not have a valid built-in vehicle interface and only has a counterfeit version thereof, the counterfeit built-in interface would not pass the parking enforcement application.

Furthermore, if the handicapped parking permit associated with Jennifer's built-in vehicle interface expires or is revoked by the issuing authority, the visual display present a specific color or specific pattern of blinking to alert both Jennifer and the enforcement agents for possible violations. Once receiving such an alert, the computing device sends an alert email or message to Jennifer's cell phone. The specific color or specific pattern of blinking for the visual display of the built-in interface is reset by the issuing entity when Jennifer fulfills the requirement of renewing.

Example 4—a Veteran Amputee's Usage of his Handicap License Plate

Marine Corps veteran Brandon is a double-amputee and walks in prosthetic legs. He applied for and obtains a smart handicap license plate, which is mailed to him. This handicap license plate comprises a solar panel, a visual indicator, and a power source. The solar panel converts sunlight into energy. The visual indicator flashes a green light when Brandon's car parked at a parking space without violating any parking rules/regulations, and flashes a red light when his car parked illegally. The power source is a battery.

When Brandon goes to the veteran's office to inquire about his benefits, he parks his car in a parking space for the disabled. A unique identifier transmitted from the handicap license plate on his car via a wireless radio, and is received by a computing device (such as a parking meter) in the parking lot. The computing device sends an inquiry to a biometric module of the handicap license plate. The biometric module activates a program in Brandon's cell phone and requires a finger print of Brandon or a PIN number, both of which have been recorded and saved by a DMV server when the license plate was issued. Brandon types in his PIN which is received by the computing device for verification purposes. Sometimes, Brandon chooses to send in an input of his fingerprint through a fingerprint scanner.

The computing device then transmits the received PIN or fingerprints together with the unique identifier to a central parking database, which communicates with the DMV database containing Brandon's PIN and fingerprint record and which sends handicap license plate configuration data back to the computing device. The configuration data comprise one of more of verification of the authenticity of the handicap license plate, validation of the handicap license plate, the identity of the authorized parking user, and restrictions on the handicapped parking privileges. If the maximum parking duration for this specific parking is 3 hours, upon the verification of Brandon's identify, his handicap license plate is activated for a parking period of 3 hours. In the meantime, a visual indicator starts blinking green during the remaining 3 hours of current parking.

A parking enforcement application is executed on a parking meter or on a mobile device of a parking enforcement officer or of a patrolling policeman. The parking enforcement application comprises a software module configured to receive the unique identifier from the handicap license plate and use the unique identifier to query a central parking database for handicap license plate configuration data. The parking enforcement application is used to identify the user of the handicap license plate as truly Brandon by verifying the input through the fingerprint, PIN or other verification methodology. In some cases, the parking enforcement application detects vehicles using handicapped parking lots, communicates with the license plate of each vehicle, retrieves unique identifier from each vehicle, identifies users whose unique identifiers do not qualify for or associated with a handicapped parking status in the DMV database or who are not the legitimate user of each handicap license plate according to the fingerprint, PIN or other verification methodology, and alerts the parking enforcement officer or patrolling policeman to take action.

In addition, the parking enforcement application automatically alerts the parking enforcement officer or patrolling policeman when a properly parked vehicle exceeds its allowed or valid parking duration according to its handicapped parking privileges. For example, although the visual display on the built-in interface is initially green, indicating a proper use, the visual display turns red after the 2 hours parking privilege expires. In some cases, a visual check for the color of the visual display on the built-in interface allows the parking enforcement officer or the patrolling policeman to tell the status of Brandon's parking duration. In some cases, a visual display of a forfeited handicap license plate does not respond to testing commands sent from the parking enforcement application, thereby allowing the enforcement officer or patrolling policeman to quickly identify violators of handicapped parking privileges. For example, the testing command can be a command to cause the visual display to blink at a predetermined frequency. In some cases, additional features like RFID and online validation via wireless handheld device would authenticate the license plate in real time. If Brandon does not have a valid handicap license plate and only has a counterfeit license plate, the counterfeit license plate would not pass the parking enforcement application.

Furthermore, if the handicapped parking permit associated with Brandon's handicap license plate expires or is revoked by the issuing authority, the visual display present a specific color or specific pattern of blinking to alert both Brandon and the enforcement agents for possible violations. Once receiving such an alert, the computing device sends an alert email or message to Brandon's cell phone. The specific color or specific pattern of blinking for the visual display of the license plate is reset by the issuing entity when Brandon fulfills the requirement of renewing.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

What is claimed is:

1. A computer-implemented method of operating a handicapped parking system comprising:
   a) wirelessly receiving, by a computing device, a unique identifier transmitted from an in-vehicle electronic handicapped parking plug-in computing device, wherein the in-vehicle electronic handicapped parking plug-in computing device connects with an electronic system of a vehicle via a connection at a port of the vehicle;
   b) receiving, at the computing device, input from a parking user verifying their identity;
   c) transmitting, by the computing device, the unique identifier and the input from the parking user to a central parking database;
   d) receiving, by the computing device, handicapped parking configuration data from the central parking database in response to the transmission, the handicapped parking configuration data comprising one or more of: verification of the authenticity of the electronic handicapped parking plug-in computing device, validation of the electronic handicapped parking plug-in computing device, the identity of as authorized parking user, and restrictions on handicapped parking privileges; and
   e) successfully verifying the identity of the parking user based on the handicapped parking configuration data received from the central parking database, and upon such successful verification, activating the electronic handicapped parking plug-in computing device for a parking period, allowing interrogation of a passive RFID tag for the purposes of validation of the electronic handicapped parking plug-in computing device.

2. The method of claim 1, wherein the computing device is a parking meter.

3. The method of claim 1, wherein the computing device is a mobile computing device of the parking user.

4. The method of claim 1, wherein the input from the parking user is a personal identification number (PIN).

5. The method of claim 1, wherein the input from the parking user is biometric data.

6. The method of claim 1, wherein the computing device is configured to present an interface to renew or extend the validity of the electronic handicapped parking plug-in computing device.

7. The method of claim 1, further comprising: activating, by the computing device, a visual display on the electronic handicapped parking plug-in computing device, the display configured to provide a counter indicating the time remaining in a current parking period.

8. The method of claim 1, wherein the port of the comprises an On-Board Diagnostics Type 2 (OBD-II) port.

9. A platform comprising:
   a) an electronic handicapped parking plug-in device comprising: a processor, a memory, a power source, a biometric verification module, a passive RFID tag, and a wireless communications module communicating a unique identifier to an external application;
   b) a parking user application comprising a software module receiving the unique identifier and using the identifier to query a central parking database to enter or edit handicapped parking plug-in device configuration data and renew or extend the validity of the plug-in device; and
   c) a parking enforcement application comprising a software module receiving the unique identifier and using the identifier to query the central parking database for handicapped parking configuration data, the handicapped parking configuration data comprising the identity of an authorized parking user, and one or more of: verification of the authenticity of the electronic handicapped parking plug-in device, validation of the electronic handicapped parking plug-in device, and restrictions on handicapped parking privileges;
   the biometric verification module receiving an input from a parking user, verifying the identity of the parking user as the authorized parking user based on the handicapped parking configuration data from the central parking database, and upon verification, activating the handicapped parking plug-in device for a parking period, and allowing interrogation of the passive RFID tag for the purposes of validation of the plug-in device.

10. The platform of claim 9, wherein the parking enforcement application is executed on a parking meter.

11. The platform of claim 9, wherein the parking enforcement application is executed on a mobile computing device of a parking enforcement officer.

12. The platform of claim 9, wherein the parking user application is executed on a mobile computing device of the parking user.

13. The platform of claim 9, wherein the electronic handicapped parking plug-in device further comprises: a visual display configured to provide a counter indicating the time remaining in the current parking period.

14. The platform of claim 9, wherein the plug-in device further comprises a connection to an electronic system of a vehicle via a connection at a port of the vehicle.

15. The platform of claim 14, wherein the port of the vehicle comprises an On-Board Diagnostics Type 2 (OBD-II) port.

* * * * *

UNITED STATES PATENT AND TRADEMARK OFFICE
CERTIFICATE OF CORRECTION

PATENT NO. : 10,691,904 B1  
APPLICATION NO. : 15/423268  
DATED : June 23, 2020  
INVENTOR(S) : Chad P. Randall, David William King and Alexander Schwarz Page 1 of 1

It is certified that error appears in the above-identified patent and that said Letters Patent is hereby corrected as shown below:

In the Claims

In Claim 1, Column 35, Line 51 please delete "as authorized parking user" and replace with --an authorized parking user--

In Claim 8, Column 36, Lines 14 and 15 please delete "port of the comprises" and replace with --port of the vehicle comprises--

Signed and Sealed this  
Ninth Day of March, 2021

Drew Hirshfeld  
*Performing the Functions and Duties of the*  
*Under Secretary of Commerce for Intellectual Property and*  
*Director of the United States Patent and Trademark Office*